US012355817B2

(12) United States Patent
Iyer et al.

(10) Patent No.: US 12,355,817 B2
(45) Date of Patent: *Jul. 8, 2025

(54) DATA LOSS PREVENTION (DLP) FOR CLOUD RESOURCES VIA METADATA ANALYSIS

(71) Applicant: Netskope, Inc., Santa Clara, CA (US)

(72) Inventors: Sudha Iyer, Sunnyvale, CA (US); VenkataSwamy Pathapati, Koduru Mandal (IN); Kenil Patel, Surat (IN); Krishna Narayanaswamy, Saratoga, CA (US)

(73) Assignee: Netskope, Inc., Santa Clara, CA (US)

( * ) Notice: Subject to any disclaimer, the term of this patent is extended or adjusted under 35 U.S.C. 154(b) by 375 days.

This patent is subject to a terminal disclaimer.

(21) Appl. No.: 17/878,875

(22) Filed: Aug. 1, 2022

(65) Prior Publication Data
US 2022/0377112 A1 Nov. 24, 2022

Related U.S. Application Data

(63) Continuation of application No. 16/411,039, filed on May 13, 2019, now Pat. No. 11,405,423, which is a continuation-in-part of application No. 16/118,278, filed on Aug. 30, 2018, now Pat. No. 11,403,418, and a continuation-in-part of application No. 16/000,132,
(Continued)

(51) Int. Cl.
*H04L 29/06* (2006.01)
*G06F 16/28* (2019.01)
*G06F 16/951* (2019.01)
*G06F 21/62* (2013.01)
*H04L 9/40* (2022.01)

(52) U.S. Cl.
CPC ............ *H04L 63/20* (2013.01); *G06F 16/285* (2019.01); *G06F 16/951* (2019.01); *G06F 21/6209* (2013.01); *H04L 63/0281* (2013.01); *H04L 63/10* (2013.01); *H04L 63/104* (2013.01); *H04L 63/105* (2013.01); *H04L 63/12* (2013.01)

(58) Field of Classification Search
None
See application file for complete search history.

(56) References Cited

U.S. PATENT DOCUMENTS

| | | |
|---|---|---|
| 5,440,723 A | 8/1995 | Arnold et al. |
| 6,513,122 B1 | 1/2003 | Magdych et al. |

(Continued)

FOREIGN PATENT DOCUMENTS

EP    1063833 A2    12/2000

OTHER PUBLICATIONS

U.S. Appl. No. 16/408,215 Notice of Allowance mailed Mar. 1, 2022, 12 pages.
(Continued)

*Primary Examiner* — Shin-Hon (Eric) Chen

(57) ABSTRACT

The technology disclosed relates to an introspector that scans an organization's accounts on cloud storage services and detects resources on the cloud storage services configured to store the organization's data, and identifies the detected resources in a resource list. The technology disclosed further includes an inline proxy that controls manipulation of the detected resources based on the resource list.

20 Claims, 10 Drawing Sheets

Related U.S. Application Data filed on Jun. 5, 2018, now Pat. No. 10,291,657, which is a continuation of application No. 15/368,246, filed on Dec. 2, 2016, now Pat. No. 11,019,101, and a continuation of application No. 15/368,240, filed on Dec. 2, 2016, now Pat. No. 10,826,940.

(60) Provisional application No. 62/307,305, filed on Mar. 11, 2016.

(56) References Cited

U.S. PATENT DOCUMENTS

| | | | |
|---|---|---|---|
| 6,574,655 | B1 | 6/2003 | Libert et al. |
| 6,622,248 | B1 | 9/2003 | Hirai |
| 7,080,408 | B1 | 7/2006 | Pak et al. |
| 7,298,864 | B2 | 11/2007 | Jones |
| 7,376,719 | B1 | 5/2008 | Shafer et al. |
| 7,735,116 | B1 | 6/2010 | Gauvin |
| 7,966,654 | B2 | 6/2011 | Crawford |
| 7,996,373 | B1 * | 8/2011 | Zoppas ................ G06F 21/554 707/694 |
| 8,000,329 | B2 | 8/2011 | Fendick et al. |
| 8,296,178 | B2 | 10/2012 | Hudis et al. |
| 8,321,560 | B1 * | 11/2012 | Pai ..................... G06F 11/0793 709/224 |
| 8,365,243 | B1 * | 1/2013 | Lu ....................... G06F 21/6209 726/1 |
| 8,438,630 | B1 | 5/2013 | Clifford |
| 8,782,790 | B1 | 7/2014 | Smith et al. |
| 8,793,151 | B2 | 7/2014 | DelZoppo et al. |
| 8,800,024 | B2 * | 8/2014 | Cooper ................... H04L 63/10 726/13 |
| 8,839,417 | B1 | 9/2014 | Jordan |
| 9,069,992 | B1 | 6/2015 | Vaikar et al. |
| 9,141,808 | B1 * | 9/2015 | Agrawal ................ G06F 21/60 |
| 9,197,601 | B2 | 11/2015 | Pasdar |
| 9,225,734 | B1 | 12/2015 | Hastings |
| 9,231,968 | B2 | 1/2016 | Fang et al. |
| 9,280,678 | B2 | 3/2016 | Redberg |
| 9,692,759 | B1 * | 6/2017 | Chandrasekhar ....... H04L 67/10 |
| 9,811,662 | B2 | 11/2017 | Sharpe et al. |
| 10,079,835 | B1 * | 9/2018 | Dodke ................ H04L 63/0245 |
| 10,084,825 | B1 | 9/2018 | Xu |
| 10,148,694 | B1 * | 12/2018 | Sarin ....................... H04L 63/14 |
| 10,237,282 | B2 | 3/2019 | Nelson et al. |
| 10,248,797 | B1 * | 4/2019 | Shinde ................. H04L 67/568 |
| 10,284,586 | B1 * | 5/2019 | Shinde ................ H04L 63/1433 |
| 10,291,657 | B2 | 5/2019 | Narayanaswamy et al. |
| 10,334,442 | B2 | 6/2019 | Vaughn et al. |
| 10,366,242 | B2 * | 7/2019 | Balinsky ............... G06F 9/4843 |
| 10,382,468 | B2 | 8/2019 | Dods |
| 10,447,720 | B1 * | 10/2019 | Evans ................ H04L 63/0428 |
| 10,484,334 | B1 | 11/2019 | Lee et al. |
| 10,594,730 | B1 | 3/2020 | Summers et al. |
| 10,812,531 | B2 | 10/2020 | Narayanaswamy et al. |
| 10,826,940 | B2 | 11/2020 | Narayanaswamy et al. |
| 10,826,941 | B2 | 11/2020 | Jain et al. |
| 10,979,458 | B2 | 4/2021 | Narayanaswamy et al. |
| 11,019,101 | B2 | 5/2021 | Narayanaswamy et al. |
| 11,032,301 | B2 | 6/2021 | Mandrychenko et al. |
| 11,036,856 | B2 | 6/2021 | Graun et al. |
| 11,064,013 | B2 | 7/2021 | Cheng et al. |
| 11,281,775 | B2 | 3/2022 | Burdett et al. |
| 11,403,418 | B2 | 8/2022 | Narayanaswamy et al. |
| 11,425,169 | B2 | 8/2022 | Narayanaswamy et al. |
| 11,451,587 | B2 | 9/2022 | Narayanaswamy et al. |
| 2002/0099666 | A1 | 7/2002 | Dryer et al. |
| 2003/0055994 | A1 | 3/2003 | Herrmann et al. |
| 2003/0063321 | A1 | 4/2003 | Inoue et al. |
| 2003/0172292 | A1 | 9/2003 | Judge |
| 2003/0204632 | A1 | 10/2003 | Willebeek-Lemair et al. |
| 2004/0015719 | A1 | 1/2004 | Lee et al. |
| 2005/0010593 | A1 | 1/2005 | Fellenstein et al. |
| 2005/0271246 | A1 | 12/2005 | Sharma et al. |
| 2005/0289354 | A1 | 12/2005 | Borthakur et al. |
| 2006/0156401 | A1 | 7/2006 | Newstadt et al. |
| 2007/0204018 | A1 | 8/2007 | Chandra et al. |
| 2007/0237147 | A1 | 10/2007 | Quinn et al. |
| 2008/0069480 | A1 | 3/2008 | Aarabi et al. |
| 2008/0127303 | A1 | 5/2008 | Wrighton et al. |
| 2008/0134332 | A1 | 6/2008 | Keohane et al. |
| 2008/0216174 | A1 | 9/2008 | Vogel et al. |
| 2009/0144818 | A1 | 6/2009 | Kumar et al. |
| 2009/0249470 | A1 | 10/2009 | Litvin et al. |
| 2009/0300351 | A1 | 12/2009 | Lei et al. |
| 2010/0017436 | A1 | 1/2010 | Wolge |
| 2010/0146269 | A1 | 6/2010 | Baskaran |
| 2011/0119481 | A1 | 5/2011 | Auradkar et al. |
| 2011/0145594 | A1 | 6/2011 | Jho et al. |
| 2012/0278896 | A1 | 11/2012 | Fang et al. |
| 2013/0159694 | A1 | 6/2013 | Chiueh et al. |
| 2013/0298190 | A1 | 11/2013 | Sikka et al. |
| 2013/0347085 | A1 | 12/2013 | Hawthorn et al. |
| 2014/0013112 | A1 | 1/2014 | Cidon et al. |
| 2014/0026182 | A1 | 1/2014 | Pearl et al. |
| 2014/0068030 | A1 | 3/2014 | Chambers et al. |
| 2014/0068705 | A1 | 3/2014 | Chambers et al. |
| 2014/0259093 | A1 | 9/2014 | Narayanaswamy et al. |
| 2014/0282843 | A1 | 9/2014 | Buruganahalli et al. |
| 2014/0310392 | A1 | 10/2014 | Ho |
| 2014/0359282 | A1 | 12/2014 | Shikfa et al. |
| 2014/0366079 | A1 | 12/2014 | Pasdar |
| 2015/0074744 | A1 * | 3/2015 | McLean .............. H04W 12/126 726/1 |
| 2015/0100357 | A1 | 4/2015 | Seese et al. |
| 2015/0254469 | A1 | 9/2015 | Butler |
| 2016/0269467 | A1 | 9/2016 | Lee et al. |
| 2016/0277374 | A1 | 9/2016 | Reid et al. |
| 2016/0285835 | A1 * | 9/2016 | Linga ................... G06F 21/6218 |
| 2016/0285918 | A1 | 9/2016 | Peretz et al. |
| 2016/0292445 | A1 | 10/2016 | Lindemann |
| 2016/0323318 | A1 | 11/2016 | Terrill et al. |
| 2016/0350145 | A1 | 12/2016 | Botzer et al. |
| 2017/0063720 | A1 | 3/2017 | Foskett et al. |
| 2017/0064005 | A1 | 3/2017 | Lee |
| 2017/0091482 | A1 | 3/2017 | Sarin et al. |
| 2017/0093917 | A1 | 3/2017 | Chandra et al. |
| 2017/0250951 | A1 | 8/2017 | Wang et al. |
| 2017/0353496 | A1 * | 12/2017 | Pai .......................... H04L 63/10 |
| 2018/0063182 | A1 | 3/2018 | Jones et al. |
| 2020/0050686 | A1 | 2/2020 | Kamalapuram et al. |
| 2021/0367976 | A1 * | 11/2021 | Khurshid ............ H04L 63/1416 |

OTHER PUBLICATIONS

U.S. Appl. No. 16/737,759 Non-Final Office Action mailed Mar. 4, 2022, 15 pages.

U.S. Appl. No. 16/737,759 Notice of Allowance mailed May 17, 2022, 7 pages.

U.S. Appl. No. 17/227,074 Non-Final Office Action dated Jan. 13, 2023, 18 pgs.

European Search Report issued in EP Application No. 21191734.9, dated Jul. 12, 2022, 7 pages, Jul. 12, 2022.

Bremler, Bremler-Barr Anat, et al., "Deep Packet Inspection as a Service", Proceedings of the 10th ACM International on Conference on Emerging Networking Experiments and Technologies, Conext '14, ACM Press, NY, NY, USA, Dec. 2, 2014 (Dec. 2, 2014), pp. 271-282, XP058504928, DOI: 10.1145/2674005.2674984 ISBN: 978-1-4503-3279-8, Dec. 2, 2014.

Harmeet, Khanuja, et al., "Role of metadata in forensic analysis of database attack", 2014 IEEE International Advance Computing Conference (IACC), IEEE, Feb. 21, 2014 (Feb. 21, 2014), pp. 457-462, XP032581097, DOI: 10.1109/IADCC.2014.6779367 [retrieved on Mar. 26, 2014], Feb. 21, 2014.

Communication Pursuant to Article 94(3) EPC dated Jun. 15, 2023 issued in App. No. 19727564.7, 6 pages.

JP Application No. 2020-565464, First Office Action mailed May 9, 2023, 7 pages.

U.S. Appl. No. 17/227,074 Non-Final Office Action mailed May 11, 2023, 19 pages.

(56) References Cited

OTHER PUBLICATIONS

U.S. Appl. No. 17/227,074 Non-Final Office Action mailed Aug. 21, 2023, 12 pages.
U.S. Appl. No. 17/831,437, Non-Final Office Action mailed May 10, 2023, 27 pages.
Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54.
Huckaby, Jeff "Ending Clear Text Protocols," Rackaid.com, Dec. 9, 2008, 3 pgs.
Newton, Harry "fabric," Newton's Telecom Dictionary, 30th Updated, Expanded, Anniversary Edition, 2016, 3 pgs.
Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss-labs.
Fortinet, "Fortinet Security Fabric Named 2016 CRN Network Security Product of the Year [press release]", Dec. 5, 2016, 4 pgs, available at https://www.fortinet.com/corporate/about-us/newsroom/press-releases/2016/fortinet-security-fabric-named-2016-crn-network-security-product.
McCullagh, Declan, "How safe is instant messaging? A security and privacy survey," CNET, Jun. 9, 2008, 14 pgs.
Beck et al., "IBM and Cisco: Together for a World Class Data Center," IBM Redbooks, Jul. 2013, 654 pgs.
Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54/.
Zetter, Kim, "Revealed: The Internet's Biggest Security Hole," Wired, Aug. 26, 2008, 13 pgs.
Adya et al., "Farsite: Federated, available, and reliable storage for an incompletely trusted environment," SIGOPS Oper. Syst. Rev. 36, SI, Dec. 2002, pp. 1-14.
Agrawal et al., "Order preserving encryption for numeric data," In Proceedings of the 2004 ACM SIGMOD international conference on Management of data, Jun. 2004, pp. 563-574.
Balakrishnan et al., "A layered naming architecture for the Internet," Acm Sigcomm Computer Communication Review, 34(4), 2004, pp. 343-352.
Downing et al., Naming Dictionary of Computer and Internet Terms, (11th Ed.) Barron's, 2013, 6 pgs.
Downing et al., Dictionary of Computer and Internet Terms, (10th Ed.) Barron's, 2009, 4 pgs.
Zoho Mail, "Email Protocols: What they are & their different types," 2006, 7 pgs. available at https://www.zoho.com/mail/glossary/email-protocols.html# :~: text=mode of communication.-, What are the different email protocols%3F, and also has defined functions.
NIIT, Special Edition Using Storage Area Networks, Que, 2002, 6 pgs.
Chapple, Mike, "Firewall redundancy: Deployment scenarios and benefits," TechTarget, 2005, 5 pgs. available at https://www.techtarget.com/searchsecurity/tip/Firewall-redundancy-Deployment-scenarios-and-benefits? Offer=abt_pubpro_AI-Insider.
Fortinet, FortiGate—3600 User Manual (vol. 1, Version 2.50 MR2) Sep. 5, 2003, 329 pgs.
Fortinet, FortiGate SOHO and SMB Configuration Example, (Version 3.0 MR5), Aug. 24, 2007, 54 pgs.
Fortinet, FortiSandbox—Administration Guide, (Version 2.3.2), Nov. 9, 2016, 191 pgs.
Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4-Administration_Guide.pdf.
Fortinet, FortiOS—Administration Guide, (Versions 6.4.0), Jun. 3, 2021, 1638 pgs.
Heady et al., "The Architecture of a Network Level Intrusion Detection System," University of New Mexico, Aug. 15, 1990, 21 pgs.
Kephart et al., "Fighting Computer Viruses," Scientific American (vol. 277, No. 5) Nov. 1997, pp. 88-93.
Wang, L., Chapter 5: Cooperative Security in D2D Communications, "Physical Layer Security in Wireless Cooperative Networks," 41 pgs. first online on Sep. 1, 2017 at https://link.springer.com/chapter/10.1007/978-3-319-61863-0_5.
Lee et al., "A Data Mining Framework for Building Intrusion Detection Models," Columbia University, n.d. 13 pgs.
Merriam-Webster Dictionary, 2004, 5 pgs.
Microsoft Computer Dictionary, (5th Ed.), Microsoft Press, 2002, 8 pgs.
Microsoft Computer Dictionary, (4th Ed.), Microsoft Press, 1999, 5 pgs.
Mika et al., "Metadata Statistics for a Large Web Corpus," LDOW2012, Apr. 16, 2012, 6 pgs.
Oxford Dictionary of Computing (6th Ed.), 2008, 5 pgs.
Paxson, Vern, "Bro: a System for Detecting Network Intruders in Real-Time," Proceedings of the 7th USENIX Security Symposium, Jan. 1998, 22 pgs.
Fortinet Inc., U.S. Appl. No. 62/503,252, "Building a Cooperative Security Fabric of Hierarchically Interconnected Network Security Devices." n.d., 87 pgs.
Song et al., "Practical techniques for searches on encrypted data," In Proceeding 2000 IEEE symposium on security and privacy. S&P 2000, May 2000, pp. 44-55.
Dean, Tamara, Guide to Telecommunications Technology, Course Technology, 2003, 5 pgs.
U.S. Appl. No. 60/520,577, "Device, System, and Method for Defending a Computer Network," Nov. 17, 2003, 21 pgs.
U.S. Appl. No. 60/552,457, "Fortinet Security Update Technology," Mar. 2004, 6 pgs.
Tittel, Ed, Unified Threat Management For Dummies, John Wiley & Sons, Inc., 2012, 76 pgs.
Fortinet, FortiOS Handbook: UTM Guide (Version 2), Oct. 15, 2010, 188 pgs.
Full Definition of Security, Wayback Machine Archive of Merriam-Webster on Nov. 17, 2016, 1 pg.
Definition of Cooperative, Wayback Machine Archive of Merriam-Webster on Nov. 26, 2016, 1 pg.
Pfaffenberger, Bryan, Webster's New World Computer Dictionary, (10th Ed.), 2003, 5 pgs.

\* cited by examiner

DATA LOSS PREVENTION (DLP) FOR CLOUD RESOURCES VIA METADATA ANALYSIS

PRIORITY DATA

This application is a continuation of U.S. patent application Ser. No. 16/411,039, titled "Metadata-Based Data Loss Prevention (DLP) for Cloud Resources," filed on May 13, 2019, which is a continuation-in-part of U.S. Nonprovisional patent application Ser. No. 16/000,132, titled "Metadata-Based Data Loss Prevention (DLP) For Cloud Storage," filed on Jun. 5, 2018 (now U.S. Pat. No. 10,291,657 issued on May 14, 2019), which is a continuation of U.S. patent application Ser. No. 15/368,240, titled "Systems And Methods Of Enforcing Multi-Part Policies On Data-Deficient Transactions Of Cloud Computing Services," filed on Dec. 2, 2016, which claims the benefit of U.S. Provisional Patent Application No. 62/307,305, titled "Systems And Methods Of Enforcing Multi-Part Policies On Data-Deficient Transactions Of Cloud Computing Services," filed on Mar. 11, 2016.

This application is a continuation of U.S. patent application Ser. No. 16/411,039, titled "Metadata-Based Data Loss Prevention (DLP) for Cloud Resources," filed on May 13, 2019, which is a continuation-in-part of U.S. Nonprovisional patent application Ser. No. 16/000,132, titled "Metadata-Based Data Loss Prevention (DLP) For Cloud Storage," filed on Jun. 5, 2018 (now U.S. Pat. No. 10,291,657 issued on May 14, 2019), which is also a continuation of U.S. patent application Ser. No. 15/368,246, "MIDDLEWARE SECURITY LAYER FOR CLOUD COMPUTING SERVICES", filed on Dec. 2, 2016, which claims the benefit of U.S. Provisional Patent Application 62/307,305, "SYSTEMS AND METHODS OF ENFORCING MULTI-PART POLICIES ON DATA-DEFICIENT TRANSACTIONS OF CLOUD COMPUTING SERVICES", filed on Mar. 11, 2016. The priority provisional application is hereby incorporated by reference for all purposes.

This application is a continuation of U.S. patent application Ser. No. 16/411,039, titled "Metadata-Based Data Loss Prevention (DLP) for Cloud Resources," filed on May 13, 2019, which is a continuation-in-part of U.S. Nonprovisional patent application Ser. No. 16/118,278, titled "Enriching Document Metadata Using Contextual Information," filed on Aug. 30, 2018 (to issue as U.S. Pat. No. 11,403,418 on Aug. 2, 2022).

All applications listed are incorporated by reference as if fully set forth herein.

INCORPORATIONS

The following materials are incorporated by reference as if fully set forth herein:

U.S. Nonprovisional patent application Ser. No. 14/198,499, titled "Security For Network Delivered Services," filed on Mar. 5, 2014 (now U.S. Pat. No. 9,398,102 issued on Jul. 19, 2016);

U.S. Nonprovisional patent application Ser. No. 14/835,640, titled "Systems And Methods Of Monitoring And Controlling Enterprise Information Stored On A Cloud Computing Service (CCS)," filed on Aug. 25, 2015 (now U.S. Pat. No. 9,928,377 issued on Mar. 27, 2018);

U.S. Nonprovisional patent application Ser. No. 15/911,034, titled "Simulation And Visualization Of Malware Spread In A Cloud-Based Collaboration Environment," filed on Mar. 2, 2018;

U.S. Nonprovisional patent application Ser. No. 15/986,732, titled "Data Loss Prevention Using Category-Directed Parsers," filed on May 22, 2018;

U.S. Provisional Patent Application No. 62/488,703, titled "Reducing Latency And Error In Security Enforcement By A Network Security System (NSS)," filed on Apr. 21, 2017;

"Data Loss Prevention and Monitoring in the Cloud" by netSkope, Inc.;

"The 5 Steps to Cloud Confidence" by netSkope, Inc.;

"Netskope Active Cloud DLP" by netSkope, Inc.;

"Repave the Cloud-Data Breach Collision Course" by netSkope, Inc.; and

"NETSKOPE CLOUD CONFIDENCE INDEX™" by netSkope, Inc.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Cloud storage services like Amazon Web Services™ (AWS), Google Cloud Platform™ (GCP), and Microsoft Azure™ provide convenient, on-demand network access to a shared pool of configurable computing resources (e.g., networks, servers, storage, applications, and services) that can be rapidly provisioned on pay-as-you-go pricing. To accommodate a variety of potential use cases, cloud storage services offer different storage choices with different media types. Examples of different storage choices include memory, message queues, storage area network (SAN), direct-attached storage (DAS), network attached storage (NAS), databases, and backup and archive. Each of these storage options differ in performance, durability, and cost, as well as in their interfaces. Combinations of storage options form a hierarchy of data storage tiers.

Enterprise organizations have a business need to store sensitive data, such as financial or patient information, intellectual property (IP) and other information, depending on the business and industry. For example, personally identifiable information (PII) refers to information which can be used to distinguish or trace an individual's identity, such as their name, Social Security number, and biometric records, alone, or when combined with other personal or identifying information which is linked or linkable to a specific individual, such as date and place of birth and mother's maiden name. Protected health information (PHI) refers to individually identifiable health information, including demographic data, that relates to the individual's past, present or future physical or mental health or condition, the provision of health care to the individual, or the past, present, or future payment for the provision of health care to the individual, the individual's identity or for which there is a reasonable basis to believe it can be used to identify the individual. Individually identifiable health information includes many common identifiers such as name, address, birth date and Social Security number. Financial information includes credit card data and business accounting records.

An opportunity arises for the development of an improved DLP solution for cloud resources that obviates the need to perform computationally intensive content sensitivity scans.

Improved user experience and reduced runtime computation and memory consumption, with improved DLP may result.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

Figure 1:
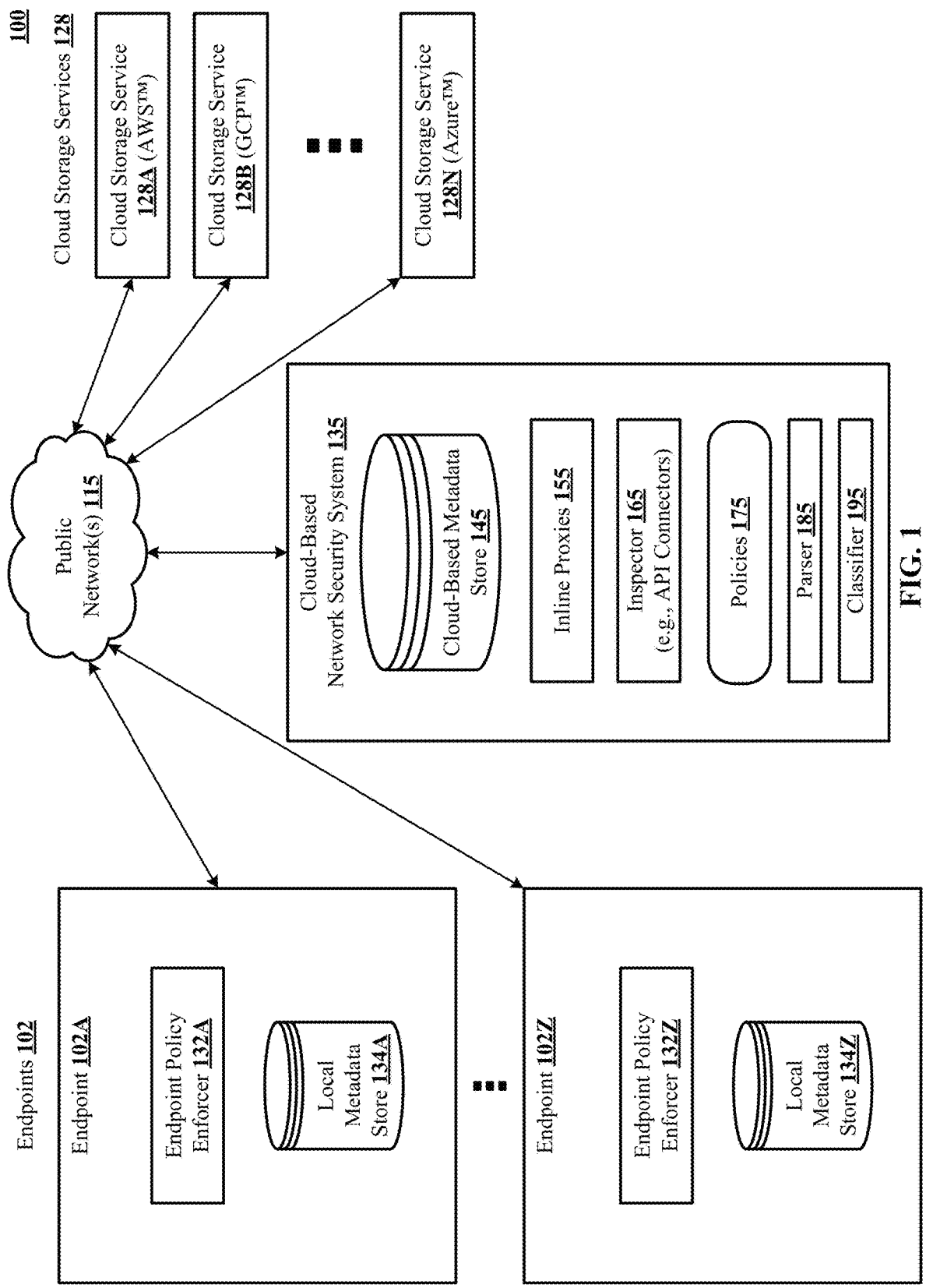
FIG. 1 illustrates one implementation of the technology disclosed operating in a cloud-based environment.

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

The discussion is organized as follows. First, an introduction describing some of the technical limitations of endpoint data loss prevention (DLP) is presented, followed by an overview of the technical improvements offered by various implementations. Then, a high-level description of cloud-based implementation is discussed at an architectural level, complemented by an on-premise implementation later. Next, the algorithms used by some implementations to provide the improved endpoint DLP are discussed using message flow charts. Lastly, more detailed architectures for implementing the system, together with network traffic monitoring in conjunction with file system monitoring are discussed.

Introduction

Cloud storage services like AMAZON WEB SERVICES™ (AWS), GOOGLE CLOUD PLATFORM™ (GCP), and MICROSOFT AZURE™ have resources such as buckets and blobs that are high-level logical constructs within which data is assembled and organized. These cloud storage services allow users to issue resource-level transactions that manipulate such cloud-based resources without identifying the data stored in the resources. For example, one can use a "cp" or "syn" command in AWS to move an S3 bucket from a corporate organization account to a personal account.

The technical problem here is that even though the end result of such resource-level transactions is data leaving an organization's account on the cloud storage services, the transactions themselves do not contain any content onto which data loss prevention (DLP) analysis can be applied. As a result, such transactions are not detected by a DLP engine, which is configured to look for sensitive content in network traffic to and from the cloud storage services.

To overcome this, we propose a metadata-based solution to prevent malicious data egress resulting from resource-level transactions. In advance of the data egress requests, we crawl an organization's accounts on different cloud storage services and make a resource list of different cloud-based resources configured under the organization's accounts. The resource list is then stored in a metadata store.

When an inline proxy receives a resource-level transaction that is requesting to move a cloud-based resource outside the organization's account, the proxy looks up the metadata store and determines whether the resource-level transaction is attempting to manipulate any of the cloud-based resources listed in the resource list. If so, then the proxy blocks the resource-level transaction. More details follow.

Cloud Environment

We describe a system and various implementations for enforcing data loss prevention policies on resource-level transactions that do not identify resource data. The system and processes are described with reference to FIG. 1. Because FIG. 1 is an architectural diagram, certain details are intentionally omitted to improve the clarity of the description. The discussion of FIG. 1 is organized as follows. First, the elements of the figure are described, followed by their interconnections. Then, the use of the elements is described in greater detail.

FIG. 1 illustrates one implementation of the technology disclosed operating in a cloud environment 100. The environment 100 includes endpoints 102A-Z, a cloud-based network security system (NSS), and cloud storage services 128A-N.

Endpoints 102A-Z access resources in the cloud storage services 128A-N via the cloud-based NSS 135. Endpoints 102A-Z respectively include endpoint policy enforcers 132A-Z and local metadata stores 134A-Z.

Cloud-based NSS 135 includes a cloud-based metadata store 145, inline proxies 155, an inspector 165, policies 175, a parser 185, and a classifier 195.

The modules of the endpoints 102A-Z and the cloud-based NSS 135 can be implemented in hardware or software, and need not be divided up in precisely the same blocks as shown in FIG. 1. Some of the modules can also be implemented on different processors or computers, or spread among a number of different processors or computers. In addition, it will be appreciated that some of the modules can be combined, operated in parallel or in a different sequence than that shown in FIG. 1 without affecting the functions achieved. Also as used herein, the term "module" can include "sub-modules," which themselves can be considered to constitute modules. For example, the endpoint policy enforcer 132A and the local metadata store 134A can be considered to be sub-modules of an endpoint security module (not shown). The blocks in the endpoints 102A-Z and the cloud-based NSS 135, designated as modules, can also be thought of as flowchart steps in a method. A module also need not necessarily have all its code disposed contiguously in memory; some parts of the code can be separated from other parts of the code with code from other modules or other functions disposed in between.

The interconnections of the elements of environment 100 are now described. The public network(s) 115 couples the endpoints 102A-Z, the cloud-based NSS 135, and the cloud storage services 128A-N, all in communication with each other (indicated by solid double-arrowed lines). The actual communication path can be point-to-point over public and/or private networks. Some items, such as the endpoint policy enforcers 132A-Z, might be delivered indirectly, e.g., via an application store (not shown). The communications can occur over a variety of networks, e.g., private networks, VPN, MPLS circuit, or Internet, and can use appropriate application programming interfaces (APIs) and data interchange formats, e.g., Representational State Transfer (REST), JavaScript Object Notation (JSON), Extensible Markup Language (XML), Simple Object Access Protocol (SOAP), Java Message Service (JMS), and/or Java Platform Module System. All of the communications can be encrypted. The communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE 3G 4G LTE Wi-Fi and WiMAX. Additionally, a variety' of authorization and authentication techniques, such as username/password, Open Authorization (OAuth), Kerberos, SecureID, digital certificates and more, can be used to secure the communications.

Endpoints 102A-Z can be desktop computers, laptops, tablet computers, mobile phones, or any other type of computing devices. The engines or system components of environments 100 such as the cloud-based NSS 135 are implemented by software running on varying types of computing devices. Example devices are a workstation, a server, a computing cluster, a blade server, and a server farm.

Having introduced the elements of FIG. 1 and their interconnections, elements of the figure are now described in greater detail.

In FIG. 1, three cloud storage services are shown, however, it is understood that environment 100 can include any number of cloud storage services. Cloud storage services 128A-N have resources that store data such as documents and thus can also be referred to as cloud-based data stores. Cloud storage services 128A-N provide functionality to users that is implemented in the cloud and that is the target of DLP policies, e.g., logging in, editing documents, downloading bulk data, reading customer contact information, entering payables, and deleting documents. They can be a network service or application, or can be web-based (e.g., accessed via a URL) or native, such as sync clients. Examples include software-as-a-service (SaaS) offerings, platform-as-a-service (PaaS) offerings, and infrastructure as-a-service (IaaS) offerings, as well as internal enterprise applications that are exposed via URLs. Examples of common cloud storage services today include BOX™, GOOGLE DRIVE™ SALESFORCE.COM™, DROPBOX™, AMAZON AWS™, MICROSOFT ONEDRIVE 365™, APPLE ICLOUD DRIVE™, ORACLE ON DEMAND™, SUGARSYNC™, IDRIVE™, and SPIDEROAK ONE™.

Cloud storage services 128A-N publish their application programming interfaces (APIs) to allow a third party to communicate with them and utilize their underlying data. An API refers to a packaged collection of code libraries, routines, protocols methods, and fields that belong to a set of classes, including its interface types. The API defines the way that developers and programmers can use the classes for their own software development, just by importing the relevant classes and writing statements that instantiate the classes and call their methods and fields. An API is a source code-based application intended to be used as an interface by software components to communicate with each other. An API can include applications for routines, data structures, object classes, and variables. Basically, an API provides an interface for developers and programmers to access the underlying data, platform capabilities, and features of cloud storage services. Implementations of the technology disclosed use different types of APIs, including web service APIs such as HTTP or HTTPs based APIs like SOAP WSDL, Bulk, XML-RPC and JSON-RPC and REST APIs (e.g., FLICKR™, GOOGLE STATIC MAPS™ GOOGLE GEOLOCATION™), web socket APIs, library-based APIs like JavaScript and TWAIN (e.g., GOOGLE MAPS™ Javascript API, DROPBOX™ JavaScript Data store API, TWILIO™ APIs, Oracle Call Interface (OCI)), class-based APIs like Java API and Android API (e.g., GOOGLE MAPS™ Android API, MSDN Class Library for .NET Framework, TWILIO™ APIs for Java and C#), OS functions and routines like access to file system and access to user interface, object remoting APIs like CORBA and .NET Remoting, and hardware APIs like video acceleration, hard disk drives, and PCI buses. Other examples of APIs used by the technology disclosed include AMAZON EC2 API™, BOX CONTENT API™, BOX EVENTS API™, MICROSOFT GRAPH™, DROPBOX API™, DROPBOX API V2™, DROPBOX CORE API™, DROPBOX CORE API V2™, FACEBOOK GRAPH APIT™, FOURSQUARE ATM, GEONAMES API™, FORCE.COM API™, FORCE.COM METADATA API™, APEX API™, VISUALFORCE API™, FORCE.COM ENTERPRISE WSDL™, SALESFORCE.COM STREAMING API™, SALESFORCE.COM TOOLING API™, GOOGLE DRIVE API™, DRIVE REST API™, ACCUWEATHER API™, and aggregated-single API like CLOUDRAIL™ API.

The discussion now turns to different examples of cloud-based resources used in the context of this application.
Resource Cloud storage services 128 provide cloud-based computation, storage, and other functionality that enable organizations and individuals to deploy applications and services on an on-demand basis and at commodity prices. Consider three example cloud storage services 128 AMAZON WEB SERVICES™ (AWS) 128A, GOOGLE CLOUD PLATFORM™ (GCP) 128B, and MICROSOFT AZURE™ 128N, however, it is understood that environment 100 can include any number of cloud storage services 128, and is not limited to these.

To accommodate a variety of potential use cases, cloud storage services 128 offer different storage choices with different media types. Examples of different storage choices include memory, message queues, storage area network (SAN), direct-attached storage (DAS), network attached storage (NAS), databases, and backup and archive. Each of these storage options differs in performance, durability, and cost, as well as in their interfaces. Combinations of storage options form a hierarchy of data storage tiers.

Figure 2:
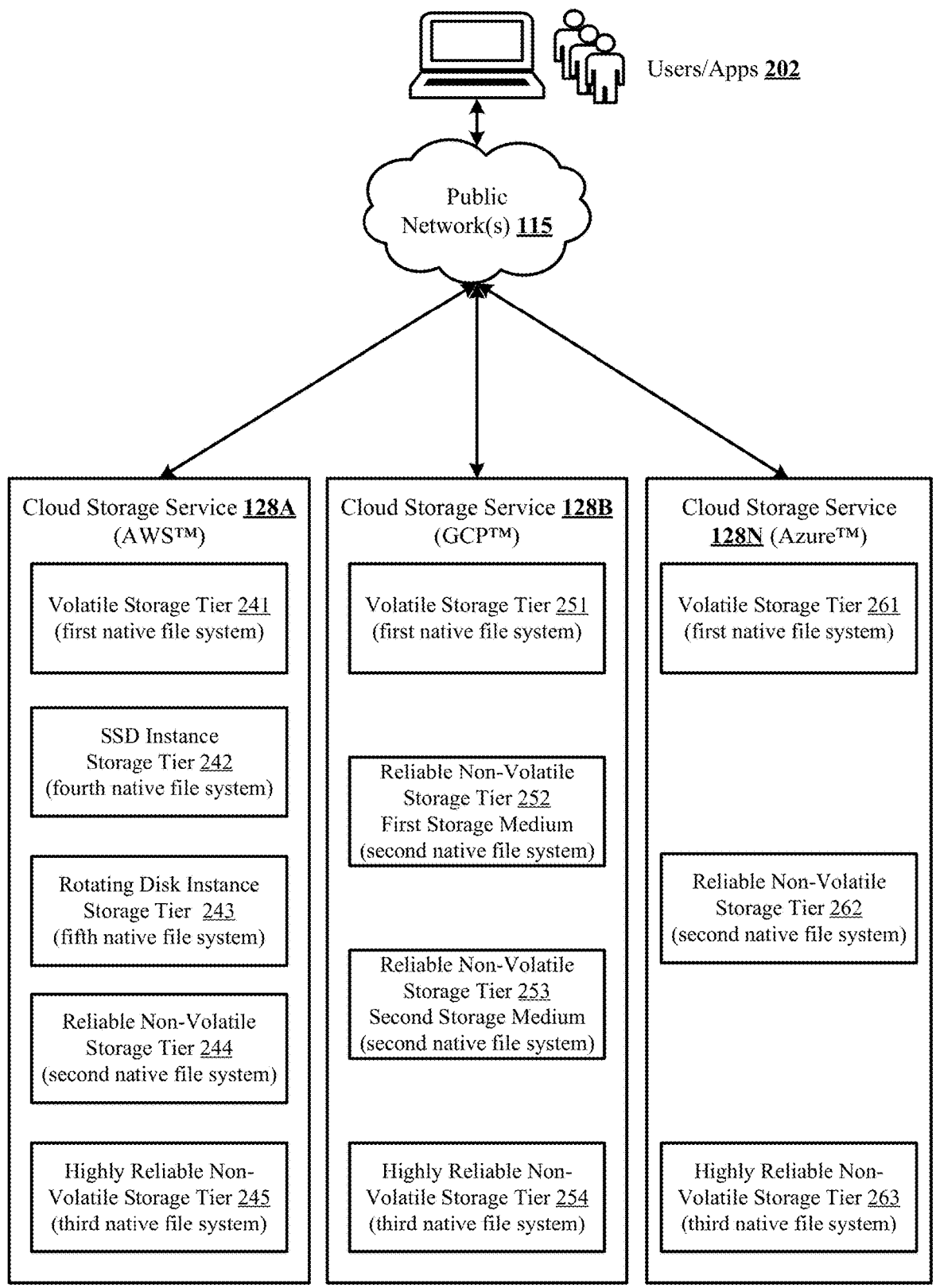
FIG. 2 shows one example of resources in different cloud storage services.

Turning to FIG. 2, AWS 128A offers multiple cloud-based storage tiers. Each tier has a unique combination of performance, durability, availability, cost, and interface, as well as other characteristics such as file systems and APIs. AWS 128A also offers an on-demand cloud computing platform called ELASTIC COMPUTE CLOUD™ (EC2), which allows users 202 to create and run compute instances on AWS 128A. EC2 instances use familiar operating systems like Linux, Windows, or OpenSolaris. Users 202 can select an instance type based on amount and type of memory and computing power needed for the application or software they plan to run on the EC2 instance. The different AWS 128A storage tiers are made accessible through EC2. Some examples of AWS 128A storage tiers accessible via EC2 are Amazon SIMPLE STORAGE SERVICE™ (S3) (scalable storage in the cloud), AMAZON GLACIER™ (low-cost archive storage in the cloud), Amazon ELASTIC BLOCK STORAGE™ (EBS) (persistent block storage volumes for Amazon EC2 virtual machines), Amazon EC2 INSTANCE STORAGE™ (temporary block storage volumes for Amazon EC2 virtual machines), Amazon ELASTICACHE™ (in-memory caching service), AWS IMPORT/EXPORT™ (large volume data transfer), AWS STORAGE GATEWAY™ (on-premises connector to cloud storage), Amazon CLOUDFRONT™ (global content delivery network (CDN)), Amazon SQS™ (message queue service), Amazon RDS™ (managed relational database server for MySQL, Oracle, and Microsoft SQL Server), Amazon DYNAMODB™ (fast, predictable, highly-scalable NoSQL data store), Amazon REDSHIFT™ (Fast, powerful, full-managed, petabyte-scale data warehouse service), and databases on Amazon EC2™ (self-managed database on an Amazon EC2 instance). For additional information about different storage options and tiers offered by AWS 128A, reference can be made to J. Baron and S. Kotecha, "Storage options in the AWS cloud," Amazon Web Services, Washington D.C., Tech. Rep., October 2013, which is incorporated by reference for all purposes as if fully set forth herein. All of these and their constituent components and subcomponents can be considered a resource in the context of this application.

In FIG. 2, five example AWS 128A storage tiers are illustrated as blocks 241-245, i.e., volatile storage tier 241, solid-state drive (SSD) instance storage tier 242, rotating disk instance storage tier 243, reliable non-volatile storage tier 244, and highly reliable non-volatile storage tier 245. Volatile storage tier 241 represents the in-memory storage of an EC2 instance, such as file caches, object caches, in-memory databases, and random access memory (RAM) disks. Volatile storage tier 241 has a first native file system that is an in-memory file system suitable for providing rapid access to data. Examples of first native file system are Apache Ignite™ and temporary file storage facility (tmpfs). Volatile storage tier 241 improves the performance of cloud-based applications by allowing data retrieval from fast, managed, in-memory caches, instead of slower disk-based databases.

Although volatile storage tier 241 is the fastest storage tier, it has the least durability and reliability of 99.9% (three nines), making it is suitable for temporary storage such as scratch disks, buffers, queues, and caches. EC2 local instance store volumes, Amazon SQS™, Amazon Elasti-Cache™ (Memcached or Redis) are some examples of AWS 128A offerings under the volatile storage tier 241.

AWS 128A offers ephemeral storage called instance tier that is physically attached to an EC2 instance. The ephemeral storage uses either rotating disks or solid-state drives (SSDs). SSD volumes can be non-volatile memory express (NVMe) based or SATA based. Ephemeral storage can also be redundant array of independent disks (RAID) configured to improve performance.

The illustrated SSD instance storage tier 242 is implemented as AWS ephemeral storage that uses SSDs as a storage medium and provides temporary block-level storage for an EC2 instance. This tier comprises a preconfigured and pre-attached block of disk storage on the same physical server that hosts the EC2 instance. SSD instance storage tier 242 has a fourth native file system that is very fast and typically best for sequential access. SSD instance storage tier 142 is optimized for high sequential input/output (I/O) performance across very large datasets. Example applications include NoSQL databases like Cassandra™ and MongoDB™, data warehouses, Hadoop™ storage nodes, seismic analysis, and cluster file systems.

While SSD instance storage tier 242 is best for temporary storage of information that is continually changing, such as buffers, scratch data, and other temporary content, or for data that is replicated across a fleet of instances, such as load-balanced pool of web servers, it is not intended to be used as durable disk storage. The SSD instance storage tier 242 has a rated durability of 99.99% (four nines), approximately. Data on this tier persists only during the life of the associate EC2 instance. Data on this tier is persistent across orderly instance reboots, but if the EC2 instance is stopped and re-started, terminates, or fails, all data on this tier is lost.

Rotating disk instance storage tier 243 is implemented as AWS ephemeral storage that uses hard disk drives (HDDs) as a storage medium and has a fifth native file system. Throughput-Optimized HDD™ and Cold HDD™ are examples of HDD volume types offered by AWS 128A. Throughput-Optimized HDD™ volumes are low-cost HDD volumes designed for frequent-access, throughput-intensive workloads such as big data, data warehouses, and log processing. These volumes are significantly less expensive than SSD volumes. Cold HDD™ volumes are designed for less frequently accessed workloads such as colder data requiring fewer scans per day. Cold HDD™ volumes are significantly less expensive than Throughput-Optimized HDD™ volumes.

Reliable non-volatile storage tier 244 is implemented as AWS Elastic Block Store™ (EBS) with a second native file system. This implementation provides block level storage volumes for use with EC2 instances. This implementation provides EBS volumes that are off-instance, network-attached storage (NAS) persisting independently from the running life of an EC2 instance. After an EBS volume is mounted to an EC2 instance, it can be used as a physical hard drive, typically by formatting it with the native file system of choice and using the file I/O interface provided by the EC2 instance operating system. There is no AWS data API for EBS. Instead, EBS presents a block-device interface to the EC2 instance. That is, to the EC2 instance, an EBS volume appears just like a local disk drive. To write to and read data from reliable non-volatile storage tier 244, the native file system I/O interfaces of the chosen operating system are used.

Reliable non-volatile storage tier 244 is designed to be highly available and reliable. Although it is slower than the volatile storage tier 241 and the instance tiers 242 and 243, it provides higher rated reliability of 99.9999% (six nines), approximately. Reliable non-volatile storage tier 244 is meant for data that changes relatively frequently and requires long-term persistence. It is often used as the primary storage for a database or file system, or for any applications that require access to raw block-level storage.

Highly reliable non-volatile storage tier 245 depicts an example AWS Amazon Simple Storage Service™ (S3) with a third native file system. This tier provides object-level storage with a web service interface to store and retrieve huge amounts of data at very low costs and high latency. It delivers the highest level of rated durability of 99.999999999% (eleven nines), approximately.

S3 provides standards-based REST and SOAP web services APIs for both management and data operations. These APIs allow S3 objects (files) to be stored in uniquely-named buckets (top-level folders). Buckets are a simple flat folder with no file system hierarchy. Each object can have a unique object key (file name) that serves as an identifier for the object within that bucket.

The third native file system of S3 is an object-based file system that operates on the whole object at once, instead of incrementally updating portions of the objects. The third native file system uses a PUT command to write objects into S3, a GET command to read objects from S3, a DELETE command to delete objects, a POST command to add objects using HyperText Markup Language (HTML) forms, and a HEAD command to return an object's metadata but not the data itself. In other implementations, a file system hierarchy (e.g., folder1/folder2/file) can also be emulated in S3 by creating object key names that correspond to the full path name of each file. All of the above and their constituent components and subcomponents can be considered a resource in the context of this application.

FIG. 2 also shows four examples of Google Cloud Platform™ (GCP) 128B storage tiers as blocks 251-254. This includes volatile storage tier 251, reliable non-volatile storage tier 252 with a first storage medium, reliable non-volatile storage tier 253 with a second storage medium, and highly reliable non-volatile storage tier 254. GCP 128B allows users 202 to create scalable virtual machines. Each virtual machine has access to memory in volatile storage tier 251 hosting a first native filesystem. The reliable non-volatile storage tier 252 offers persistent storage of data on a first storage medium (e.g., NVMe SSDs). This storage tier hosts a second native file system. The reliable non-volatile storage tier 253 also hosts the second native file system but offers persistent storage of data on a second storage medium (Seq. HDD). The highly reliable non-volatile storage tier 254 is an object store hosting a third native file system. All of the above and their constituent components and subcomponents can be considered a resource in the context of this application.

FIG. 2 further illustrates three example Microsoft Azure™ (Azure) 128C storage tiers as blocks 261-263, i.e., volatile storage tier 261, reliable non-volatile storage tier 262, and highly reliable non-volatile storage tier 263. For online transactional processing (OLTP), online analytical processing (OLAP), and hybrid transaction/analytical processing (HTAP), Azure 128C allows users 202 to optimize performance using in-memory storage of volatile storage tier 261 that hosts a first native file system. The reliable non-volatile storage tier 262 provides persistent storage of data using a block storage scheme and hosts a second native file system. The highly reliable non-volatile storage tier 263 provides object storage by storing data as blobs inside containers and hosts a third native file system. All of the above and their constituent components and subcomponents can be considered a resource in the context of this application.

A resource can be defined based on object storage. For example, AMAZON SIMPLE STORAGE SERVICE (S3)™ provides developers, and IT teams with secure, durable, and highly-scalable cloud storage. Amazon S3 is easy-to-use object storage with a simple web service interface that one can use to store and retrieve any amount of data from anywhere on the web. Amazon S3 also allows one to pay only for the storage one actually uses, which eliminates the capacity planning and capacity constraints associated with traditional storage.

Amazon S3 is one of first services introduced by AWS, and it serves as one of the foundational web services—nearly any application running in AWS uses Amazon S3, either directly or indirectly. Amazon S3 can be used alone or in conjunction with other AWS services, and it offers a very high level of integration with many other AWS cloud services. For example, Amazon S3 serves as the durable target storage for Amazon Kinesis and Amazon Elastic MapReduce (Amazon EMR), it is used as the storage for Amazon Elastic Block Store (Amazon EBS) and Amazon Relational Database Service (Amazon RDS) snapshots, and it is used as a data staging or loading storage mechanism for Amazon Redshift and Amazon DynamoDB, among many other functions.

Common use cases for Amazon S3 storage include backup and archive for on-premises or cloud data; content, media, and software storage and distribution; big data analytics; static website hosting; cloud-native mobile and Internet application hosting; and disaster recovery. To support these use cases and many more, Amazon S3 offers a range of storage classes designed for various generic use cases: general purpose, infrequent access, and archive. To help manage data through its lifecycle, Amazon S3 offers configurable lifecycle policies. By using lifecycle policies, one can have their data automatically migrate to the most appropriate storage class, without modifying their application code. In order to control who has access to their data, Amazon S3 provides a rich set of permissions, access controls, and encryption options.

Amazon Glacier is another cloud storage service related to Amazon S3, but optimized for data archiving and long-term backup at extremely low cost. Amazon Glacier is suitable for "cold data," which is data that is rarely accessed and for which a retrieval time of three to five hours is acceptable. Amazon Glacier can be used both as a storage class of Amazon S3, and as an independent archival storage service.

In traditional IT environments, two kinds of storage dominate: block storage and file storage. Block storage operates at a lower level—the raw storage device level—and manages data as a set of numbered, fixed-size blocks. File storage operates at a higher level—the operating system level—and manages data as a named hierarchy of files and folders. Block and file storage are often accessed over a network in the form of a Storage Area Network (SAN) for block storage, using protocols such as iSCSI or Fibre Channel, or as a Network Attached Storage (NAS) file server or "filer" for file storage, using protocols such as Common Internet File System (CIFS) or Network File System (NFS). Whether directly-attached or network-attached, block or file, this kind of storage is very closely associated with the server and the operating system that is using the storage.

Amazon S3 object storage is something quite different. Amazon S3 is cloud object storage. Instead of being closely associated with a server, Amazon S3 storage is independent of a server and is accessed over the Internet. Instead of managing data as blocks or files using SCSI, CIFS, or NFS protocols, data is managed as objects using an Application Program Interface (API) built on standard HTTP verbs.

Each Amazon S3 object contains both data and metadata. Objects reside in containers called buckets, and each object is identified by a unique user-specified key (filename). Buckets are a simple flat folder with no file system hierarchy. That is, one can have multiple buckets, but one cannot have a sub-bucket within a bucket. Each bucket can hold an unlimited number of objects.

It is easy to think of an Amazon S3 object (or the data portion of an object) as a file, and the key as the filename. However, keep in mind that Amazon S3 is not a traditional file system and differs in significant ways. In Amazon S3, one can GET an object or PUT an object, operating on the whole object at once, instead of incrementally updating portions of the object as one would with a file. One cannot "mount" a bucket, "open" an object, install an operating system on Amazon S3, or run a database on it.

Instead of a file system, Amazon S3 is highly-durable and highly-scalable object storage that is optimized for reads and is built with an intentionally minimalistic feature set. It provides a simple and robust abstraction for file storage that frees one from many underlying details that one normally has to deal with in traditional storage. For example, with Amazon S3, one does not have to worry about device or file system storage limits and capacity planning—a single bucket can store an unlimited number of files. One also does not need to worry about data durability or replication across availability zones—Amazon S3 objects are automatically replicated on multiple devices in multiple facilities within a region. The same with scalability—if their request rate grows steadily, Amazon S3 automatically partitions buckets to support very high request rates and simultaneous access by many clients.

A bucket is a container (web folder) for objects (files) stored in Amazon S3. Every Amazon S3 object is contained in a bucket. Buckets form the top-level namespace for Amazon S3, and bucket names are global. This means that their bucket names must be unique across all AWS accounts, much like Domain Name System (DNS) domain names, not just within their own account. Bucket names can contain up to 63 lowercase letters, numbers, hyphens, and periods. One can create and use multiple buckets; one can have up to 100 per account by default. It is a best practice to use bucket names that contain their domain name and conform to the rules for DNS names. This ensures that their bucket names are their own, can be used in all regions, and can host static websites.

Buckets are generally used for organizing objects in Amazon S3. It is associated with an AWS account that is responsible for storing and retrieving data on the bucket. The account, which owns the bucket, is charged for data transfer. Buckets play a vital role in access control and pave the way for creating usage reports on S3.

Even though the namespace for Amazon S3 buckets is global, each Amazon S3 bucket is created in a specific region that one chooses. This lets one control where their data is stored. One can create and use buckets that are located close to a particular set of end users or customers in order to minimize latency, or located in a particular region to satisfy data locality and sovereignty concerns, or located far away from their primary facilities in order to satisfy disaster recovery and compliance needs. One can control the location of their data; data in an Amazon S3 bucket is stored in that region unless one explicitly copies it to another bucket located in a different region.

Objects are the entities or files stored in Amazon S3 buckets. An object can store virtually any kind of data in any format. Objects can range in size from 0 bytes up to 5TB, and a single bucket can store an unlimited number of objects. This means that Amazon S3 can store a virtually unlimited amount of data. Each object consists of data (the file itself) and metadata (data about the file). The data portion of an Amazon S3 object is opaque to Amazon S3. This means that an object's data is treated as simply a stream of bytes—Amazon S3 does not know or care what type of data one is storing, and the service doesn't act differently for text data versus binary data. The metadata associated with an Amazon S3 object is a set of name/value pairs that describe the object. There are two types of metadata: system metadata and user metadata. System metadata is created and used by Amazon S3 itself, and it includes things like the date last modified, object size, MD5 digest, and HTTP Content-Type. User metadata is optional, and it can only be specified at the time an object is created. One can use custom metadata to tag their data with attributes that are meaningful.

Thus, in one implementation, a resource is a bucket on or of a cloud storage service. In another implementation, a resource is an object on or of a cloud storage service. Buckets and objects are also used in other cloud storage services such as MICROSOFT AZURE™, GOOGLE CLOUD PLATFORM™, and ALIBABA CLOUD STORAGE™. For example, in MICROSOFT AZURE™, the buckets correspond to blobs. Blob storage is an object-based storage service made up of containers and objects. Containers are similar to prefixes in the world of Amazon S3. There are different types of blobs: page, block, and append. In simplest terms, page blobs are used to house the VHD files that back Azure VMs. Block and append are used for everything else. Blob storage provides programmatic access for the creation of containers and objects within the storage account. Blob storage inherits the availability and durability of the storage account it resides in. Blob storage is priced by storage consumption, data transfer, and various operations. The maximum size for an individual object is 4.7 TB for block and 8 TB for page. The maximum throughput for a single blob is 60 MB/s.

In the context of ALIBABA CLOUD STORAGE™, a bucket is a container for objects stored in object storage service (OSS). Every object is contained in a bucket. The data model structure of Alibaba Cloud OSS is flat instead of hierarchical. All objects (files) are directly related to their corresponding buckets. Therefore, OSS lacks the hierarchical structure of directories and subfolders as in a file system. A user can have multiple buckets. A bucket name must be globally unique within OSS and cannot be changed once a bucket is created. A bucket can contain an unlimited number of objects. The naming conventions for buckets are as follows: the bucket names must contain only lower case letters, numbers, and hyphens (-); the bucket names must start and end with a lower-case letter or number; and the bucket names must be at least 3 bytes and no more than 63 bytes in length.

In the context of GOOGLE CLOUD PLATFORM™, buckets are the basic containers that hold your data. Everything that you store in GCP must be contained in a bucket. You can use buckets to organize your data and control access to your data, but unlike directories and folders, you cannot nest buckets. When you create a bucket, you specify a globally-unique name, a geographic location where the bucket and its contents are stored, and a default storage class. The default storage class you choose applies to objects added to the bucket that don't have a storage class specified explicitly. After you create a bucket, you can still change its default storage class, to any class supported in the bucket's location; however, you can only change the bucket name and location by deleting and re-creating the bucket. Bucket names have more restrictions than object names and must be globally unique, because every bucket resides in a single Cloud Storage namespace. Also, bucket names can be used with a CNAME redirect, which means they need to conform to DNS naming conventions. Bucket labels are key:value metadata pairs that allow you to group your buckets along with other Google Cloud Platform resources such as virtual machine instances and persistent disks. For example, you can use labels to create a team key that has values alpha, beta, and delta, and apply the team:alpha, team:beta, and team:delta labels to different buckets in order to indicate which team is associated with those buckets. You can apply multiple labels to each bucket, with a maximum of 64 labels per bucket.

Objects are the individual pieces of data that you store in Cloud Storage. There is no limit on the number of objects that you can create in a bucket. Objects have two components: object data and object metadata. Object data is typically a file that you want to store in Cloud Storage. Object metadata is a collection of name-value pairs that describe various object qualities. An object's name is treated as a piece of object metadata in Cloud Storage. Object names can contain any combination of Unicode characters (UTF-8 encoded) and must be less than 1024 bytes in length. A common character to include in object names is a slash (/). By using slashes, you can make objects appear as though they're stored in a hierarchical structure. For example, you could name one object /europe/france/paris.jpg and another object/europe/france/cannes.jpg. When you list these objects, they appear to be in a hierarchical directory structure based on location; however, GCP sees the objects as independent with no hierarchical relationship whatsoever. An object in GCP can have different versions: by default, when you overwrite an object, GCP deletes the old version and replaces it with a new version. Each object version is uniquely identified by its generation number, found in the object's metadata. When object versioning has created an older version of an object, you can use the generation number to refer to the older version. This allows you to restore an overwritten object in your bucket, or permanently delete older object versions that you no longer need. Generation numbers are also used when you include preconditions in your requests.

A resource is an entity within GCP. Each project, bucket, and object in GCP is a resource, as are things such as compute engine instances. Each resource has a unique name that identifies it, much like a filename. Buckets have a resource name in the form of projects/_/buckets/[BUCKET_NAME], where [BUCKET_NAME] is the ID of the bucket. Objects have a resource name in the form of projects/_/buckets/[BUCKET_NAME]/objects/[OBJECT_NAME], where [OBJECT_NAME] is the ID of the object. A #[NUMBER] appended to the end of the resource name indicates a specific generation of the object. #0 is a special identifier for the most recent version of an object. #0 is useful to add when the name of the object ends in a string that would otherwise be interpreted as a generation number. All of the above and their constituent components and subcomponents can be considered a resource in the context of this application.

Thus, in one implementation, a resource is a blob on or of a cloud storage service. In another implementation, a resource is a container on or of a cloud storage service. In one implementation, a resource is a project on or of a cloud storage service.

A resource can be defined based on block storage. Block storage is a type of storage that is not physically attached to a server, but it is accessed as a local storage device just like a hard disk drive. At the backend, the storage service provided creates a cluster of disks, divided into a number of storage blocks. Each block is virtually connected to a server and treated as a local storage. The server operating system manages the block of storage assigned to it. For example, AMAZON ELASTIC BLOCK STORE (EBS)™ is a block storage type. When one provisions a 100 GB EBS volume, a block of 100 GB is assigned from the cluster of disks to that volume. The EBS volume is associated with an EC2 instance. The volume is subsequently formatted and a file system is created on it. This volume is managed by the respective operating system installed on the EC2 instance for storing and retrieving data on it. As each block of storage is treated as a local disk, block storage works well for creating file systems, installing operating systems, and databases. Some examples of EBS volume types include solid state drive (SSD) with general purpose SSD offering and provisioned IOPS SSD offering; hard disk drive (HDD) with throughput optimized HHD offering and cold HHD offering; and previous generation volume with magnetic (standard) offering. In another example, AMAZON EC2 INSTANCE STORE™ also uses block storage.

Thus, in one implementation, a resource is a volume on or of a cloud storage service. In another implementation, a resource is a block on or of a cloud storage service. Volumes and blocks are also used in other cloud storage services such as MICROSOFT AZURE™, GOOGLE CLOUD PLATFORM™, and ALIBABA CLOUD STORAGE™.

A resource can be defined based on file storage. File storage or file-based storage is used for storing files and folders. File-level storage can be accessed using file-level protocols such as network file system (NFS), server message block (SMB), common internet file system (CIFS), and so on. File storage is used for storing and retrieving files and folders. AMAZON ELASTIC FILE SYSTEM (EFS)™ is a file storage type. In one implementation, a resource is a file on or of a cloud storage service. In another implementation, a resource is a folder on or of a cloud storage service. Files and folders are also used in other cloud storage services such as MICROSOFT AZURE™, GOOGLE CLOUD PLATFORM™, and ALIBABA CLOUD STORAGE™.

Thus, in one implementation, a resource is an account on or of a cloud storage service. In one implementation, a resource is a disk (or managed disk) on or of a cloud storage service.

In the context of KUBERNETES™ and DOCKER™, a resource is a pod on or of a cloud storage service, according to one implementation. In another implementation, a resource is a container on or of a cloud storage service. In yet another implementation, a resource is a storage class on or of a cloud storage service. In yet further implementation, a resource is a node on or of a cloud storage service. In another implementation, a resource is a virtual machine on or of a cloud storage service. In another implementation, a resource is a host on or of a cloud storage service.

Figure 3:
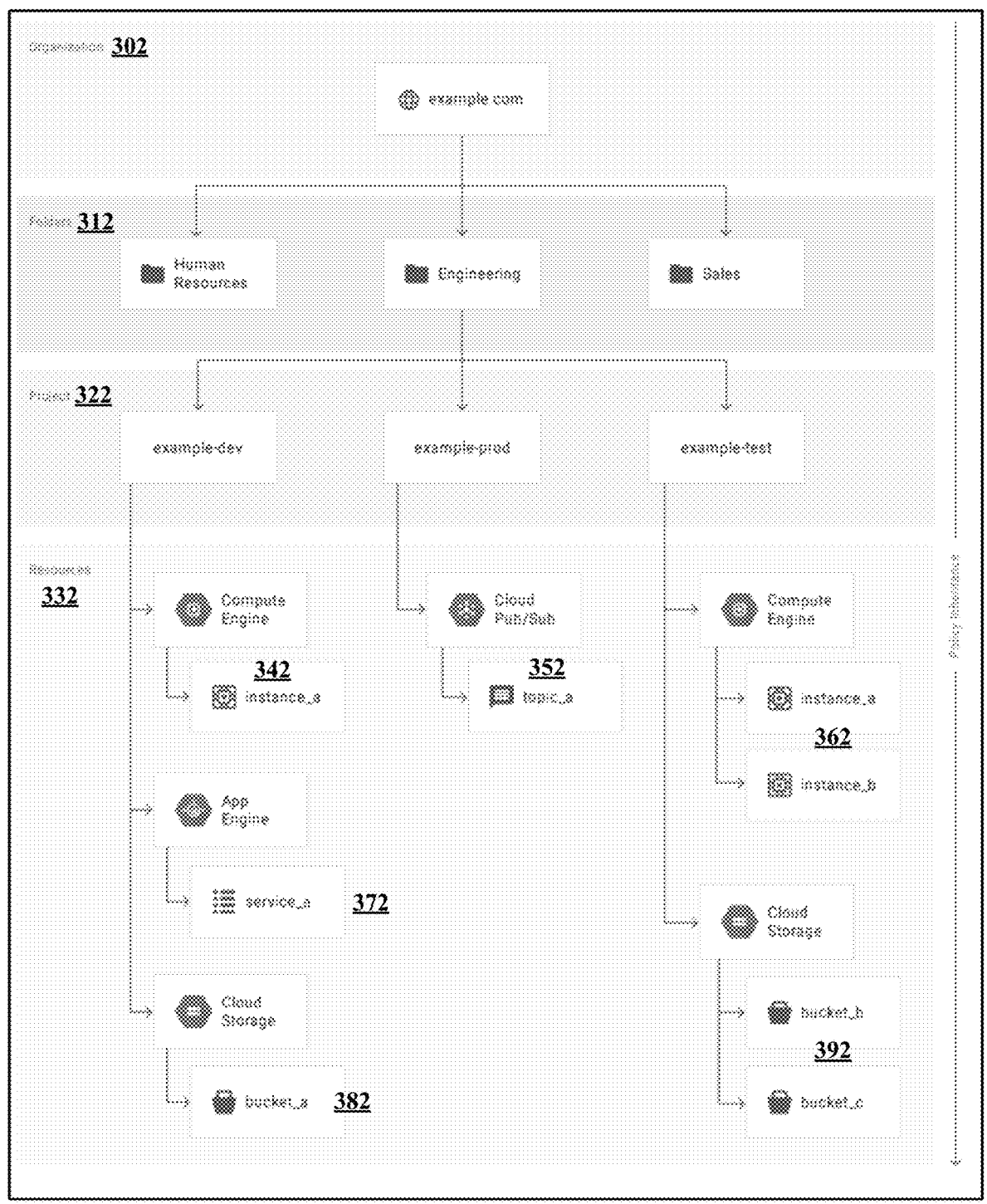
FIG. 3 shows one example of resources on GOOGLE CLOUD PLATFORM™ (GCP).

As shown in FIG. 3, in the context of GOOGLE CLOUD PLATFORM™ 128B, a resource can be an organization 302 on or of a cloud storage service, a folder 312 on or of a cloud storage service, a project 322 on or of a cloud storage service, and/or a resource 332 on or of a cloud storage service. Furthermore, a resource can be an instance 342, 362 on or of a cloud storage service, a service 372 on or of a cloud storage service, a queue on or of a cloud storage service, a bucket 382, 392 on or of a cloud storage service, and/or a topic 352 on or of a cloud storage service.

Figure 4:
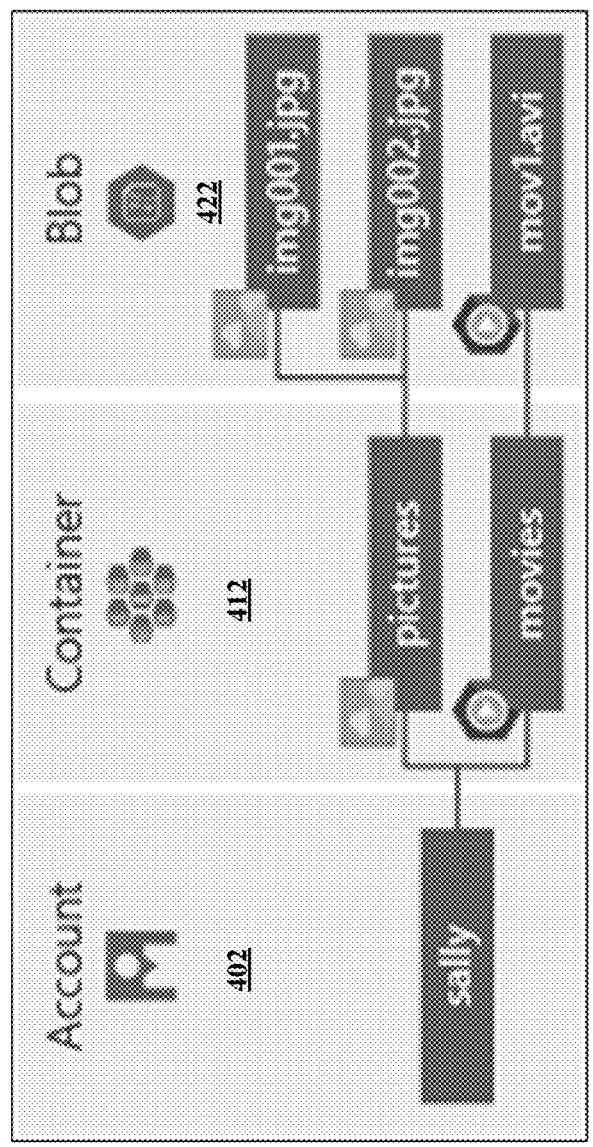
FIG. 4 shows one example of resources on MICROSOFT AZURE™.

As shown in FIG. 4, in the context of MICROSOFT AZURE™ 128C, a resource can be an account 402 on or of a cloud storage service, a container 412 on or of a cloud storage service, and/or a blob 422 on or of a cloud storage service.

In some implementations, a resource can be a compute resource such as AMAZON EC2™ or AWS LAMDA™. In some implementations, a resource can be an AWS INSTANCE STORE™ physically attached to a host computer. In some implementations, a resource can be an EBS volume. In some implementations, a resource can be an EBS snapshot, which is a point-in-time backup copy of an EBS volume that is stored in Amazon S3.

In one implementation, a resource is an AWS VIRTUAL PRIVATE CLOUD (VPC)™, which is a logically isolated area within the AWS cloud populated by infrastructure, platform, and application services that share common security and interconnection.

Figure 5:
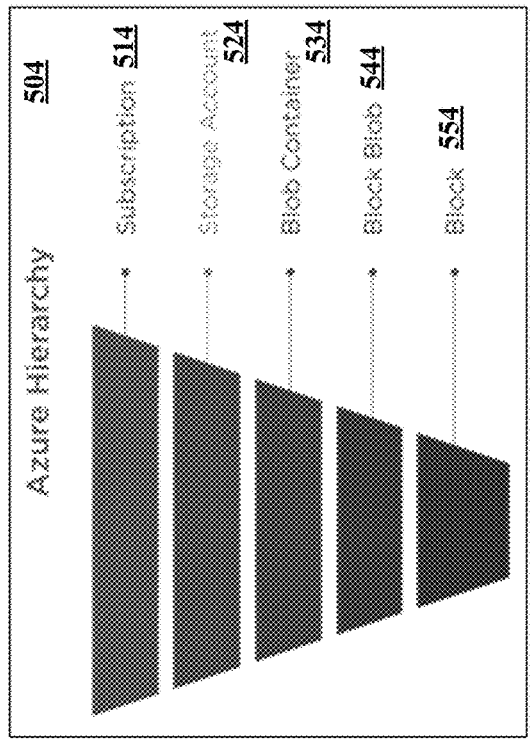
FIG. 5 shows examples of resources in the context of storage hierarchies of AMAZON WEB SERVICES™ (AWS) and MICROSOFT AZURE™.
Figure 5:
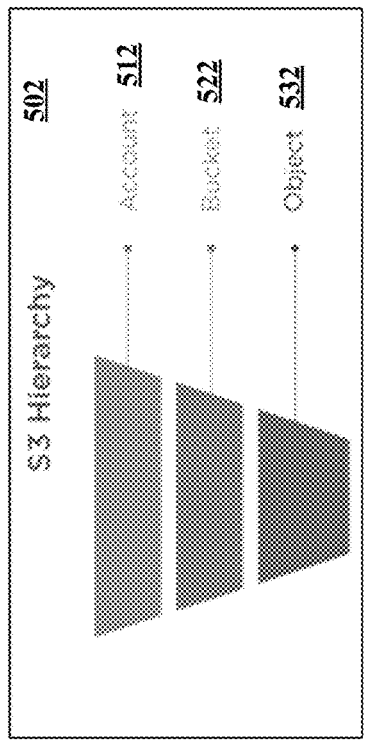

FIG. 5 also illustrates one implementation 500 of a storage hierarchy 502 of Amazon S3 with an account 512, a bucket 522, and an object 532. Also shown is a storage hierarchy 504 of Azure with a subscription 514, a storage account 524, a blob container 534, a block blob 544, and a block 554. All of the above and their constituent components and subcomponents can be considered a resource in the context of this application.

Having described the cloud storage services 128A-N and their resources, the discussion now turns how a resource list (metadata) is generated.

Resource List Generation

Cloud-based NSS 135 is interposed between the endpoints 102A-Z and the cloud storage services 128A-N to provide several security-related functionalities; key among them being proactively generating resource list 602 and storing it in the cloud-based metadata store 145. Additional details about the cloud-based NSS 135 can be found in the incorporated materials.

Cloud-based NSS 135 uses the inspector 165 to proactively generate the resource list 602. The inspector 165 uses API connectors and deep API inspection (DAPII) to crawl the organization accounts on the cloud storage services 128 and identify the different resources associated with the accounts. Additional details about the inspector 165 can be found in the incorporated materials. One example of GCP data that contains the resource information is provided below. The API connectors of the inspector 165 parse the fields of the code below and determine resource metadata that includes information such as resource. The following code includes metadata about a bucket, such as the project that contains the bucket, the name of the bucket, and the bucket's storage class.

```
{
"kind": "storage#bucket",
"id": string,
"selfLink": string,
"projectNumber": unsigned long,
"name": string,
"timeCreated": datetime,
"updated": datetime,
"defaultEventBasedHold": boolean,
"retentionPolicy": {
"retentionPeriod": unsigned long,
"effectiveTime": datetime,
"isLocked": boolean
},
"metageneration": long,
"acl": [
bucketAccessControls Resource
],
"defaultObjectAcl": [
{
"kind": "storage#objectAccessControl",
"id": string,
"selfLink": string,
"bucket": string,
"object": string,
"generation": long,
"entity": string,
"role": string,
"email": string,
"entityId": string,
"domain": string,
"projectTeam": {
"projectNumber": string,
"team": string
},
"etag": string
}
],
"iamConfiguration": {
"bucketPolicyOnly": {
"enabled": boolean,
"lockedTime":datetime,
},
},
"encryption": {
"defaultKmsKeyName": string
},
"owner": {
"entity": string,
"entityId": string
},
"location": string,
"website": {
"mainPageSuffix": string,
"notFoundPage": string
},
"logging": {
"logBucket": string,
"logObjectPrefix": string
},
"versioning": {
"enabled": boolean
},
"cors": [
{
"origin": [
string
],
"method": [
string
],
"responseHeader": [
string
],
"maxAgeSeconds": integer
}
],
"lifecycle": {
"rule": [
{
"action": {
"type": string,
"storageClass": string
},
"condition": {
"age": integer,
"createdBefore": date,
```

```
        "isLive": boolean,
        "matchesStorageClass": [
        string
        ],
        "numNewerVersions": integer
        }
      }
    ]
  },
  "labels": {
    (key): string
  },
  "storageClass": string,
  "billing": {
    "requesterPays": boolean
  },
  "etag": string
}
```

Figure 6:
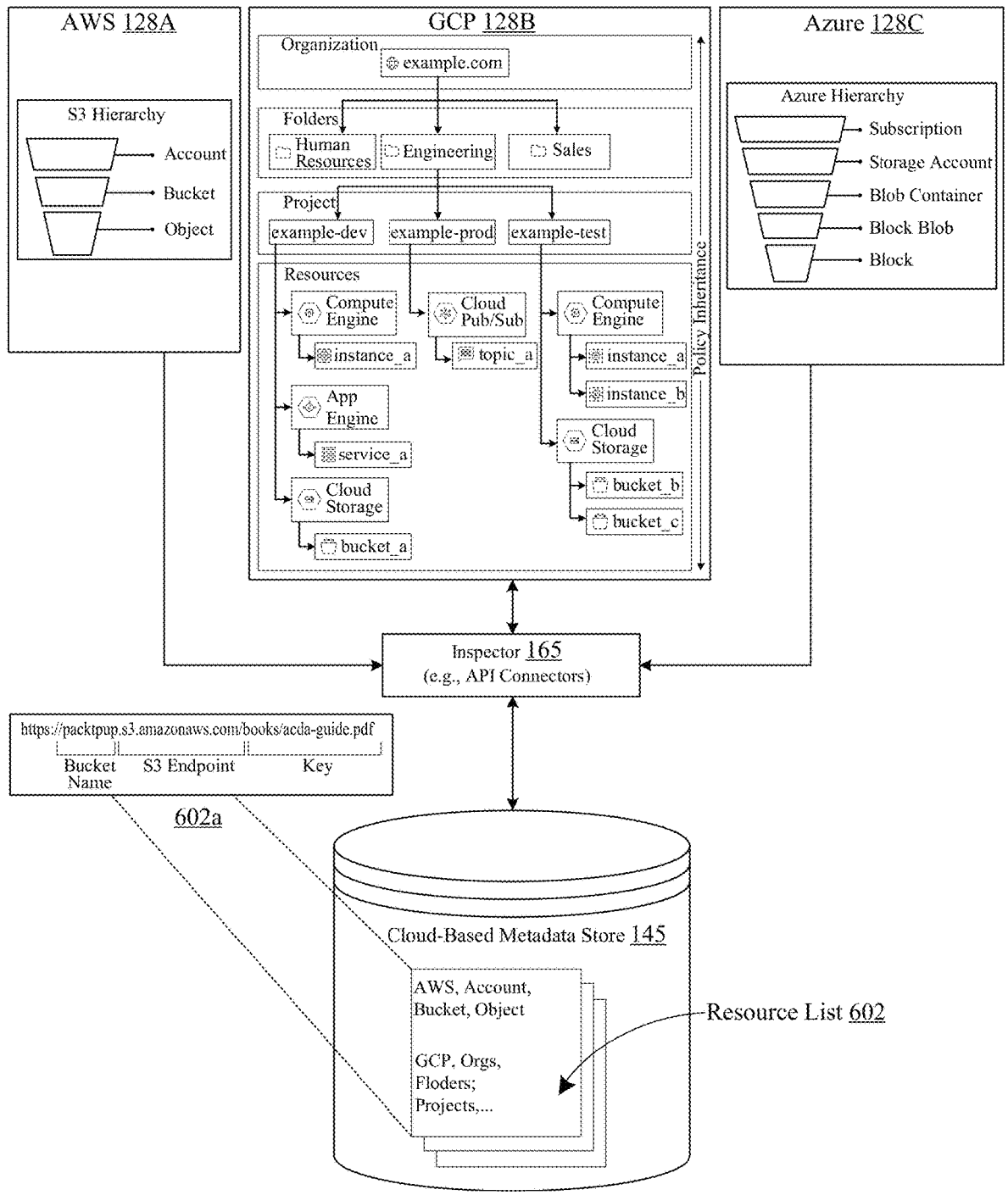
FIG. 6 shows how a resource list is generated by an introspector.

FIG. 6 illustrates an implementation 600 for generating a resource list by an introspector. The resource list 602 can identify the cloud-based resources by their names, unified resource identifiers (URIs), unified resource locators (URLs), domain names, directory addresses, IP addresses, keys, unique DNS-compliant names, region names, or any other identifiers. One example 602a of the identification is as follows: https:llpacktpub.s3. amazonaws.comlbooks/acda-guide.pdf. In this example, packtpub is the name of the S3 bucket and books/acdaguide/pdf is the key. When the resource being logged is an S3 bucket, the resource list 602 includes "packtpub" as an entry.

In another example, Azure's blob can be identified as follows:

The resource URL syntax assigns each resource a corresponding base URL, which refers to the resource itself. For the storage account, the base URI includes the name of the account only: https://myaccount.blob.core.windows.net.

For a container, the base URI includes the name of the account and the name of the container: https://myaccount.blob.core.windows.net/mycontainer.

For a blob, the base URI includes the name of the account, the name of the container, and the name of the blob: https://myaccount.blob.core.windows.net/mycontainer/myblob.

A storage account may have a root container, a default container that can be omitted from the URI. A blob in the root container can be referenced without naming the container, or the root container can be explicitly referenced by its name ($root). The following URIs both refer to a blob in the root container: https://myaccount.blob.core.windows.net/myblob, https://myaccount.blob.core.windows.net/$root/myblob.

A snapshot is a read-only version of a blob stored as it was at the time the snapshot was created. You can use snapshots to create a backup or checkpoint of a blob. A snapshot blob name includes the base blob URI plus a date-time value that indicates when the snapshot was created. For example, assume that a blob has the following URI: https://myaccount.blob.core.windows.net/mycontainer/myblob. The URI for a snapshot of that blob is formed as follows: https://myaccount.blob.core.windows.net/mycontainer/myblob?snapshot=<Date Time>.

In some implementations, the addresses of the resources can be subjected to preprocessing and just the names of the resources can be extracted and stored in the resource list 602.

In the context of this application, the resource list 602 can be generally considered metadata. In some implementations, it can be considered sensitivity metadata.

Resource-Level Transactions

A resource-level transaction can be issued from a web interface. For example, AWS offers a management console GUI that allows the users to interact with the various computing and storage resources offered by AWS. In other implementations, a command line interface (CLI) or a software development kit (SDK) can be used to initiate the resource-level transactions. In yet other implementations, APIs such as RESTful APIs can also be used.

As used herein, a "resource-level transaction" is defined as a data manipulation activity that causes manipulation of data and data objects in a cloud-based resource by merely referencing the cloud-based resource. Some examples include copying, moving, or syncing a cloud-based resource from a source location to a destination location by merely naming the cloud-based resource. Another example includes copying, moving, or syncing a cloud-based resource from a source location to a destination location by merely referencing the cloud-based resource, e.g., via a link or hyperlink (URL).

Resource-level transactions manipulate the cloud-based resources without identifying the data stored in the resources. For example, one can use a "cp" or "syn" command in AWS to move an S3 bucket from a corporate organization account to a personal account without identifying the objects or files of the S3 bucket. Additional details about the "cp" command for AWS can be found here: https://docs.aws.amazon.com/cli/latest/reference/s3/cp.html, which is incorporated herein by reference. Details about GCP's "cp" command can be found here: https://cloud.google.com/storage/docs/gsutil/commands/cp, which is incorporated herein by reference. In other implementations, Google Cloud Transfer Service can be used for data transfer, additional details about which can be found here: https://cloud.google.com/storage-transfer/docs/how-to, which is incorporated herein by reference.

The following are resource-level transaction examples that use an AWS CLI command to copy S3 buckets across AWS accounts:

aws s3 sync s3://SOURCE-BUCKET-NAME s3://DESTINATION-BUCKET-NAME—source-region SOURCE-REGION-NAME—region DESTINATION-REGION-NAME aws s3 sync s3://sourcebucket s3://destinationbucket Note that the above commands move or copy a bucket just by using its name, but do not include any data or objects inside the bucket that is being moved or copied. So, a DLP engine will have no opportunity to scan contents inside the bucket like files or documents because these commands do not contain or refer to any such contents.

As used herein, the term "policy", sometimes also referred to as a policy definition or policy data or content policy refers to a machine-readable representation of flow control and content control requirements for cloud services. Typically, a policy is defined by one or more administrators at a corporation, or other entity, and is enforced upon users within that corporation, or entity. It is possible for individuals to define policies for their own usage that are enforced upon them; however, corporate usage is the more common case. It is also possible for a policy to be enforced on visitors or customers of a cloud service, e.g. where a corporation hosts a service and requires visiting customers to adhere to the policy for use. Of particular note is that the policies considered herein are capable of being sensitive to the semantics of a cloud application, which is to say a policy can differentiate between logging in to a cloud service from, say, editing documents on the cloud service. These are stored as policies 175.

Context is important for understanding usage; for an entity, the collection of dozens or hundreds of individual policies (e.g. log bulk downloads, prohibit editing documents on the service, only allow bulk downloads for users who are in the "Vice President" group) is referred to singularly as one policy, or one policy definition. Thus, a system supporting multiple entities will generally have one policy per entity, each made up of dozens or hundreds of individual flow control and content control policies. Similarly, the policy that is transferred to individual computers can be a subset of a full corporate policy, e.g. solely a machine-readable representation of the URLs of interest, as opposed to the full policy specification for each URL describing the flow control and/or content manipulations.

As used herein, a "multi-part policy" is defined as a policy that specifies triggering of at least one security action when at least one condition about the transaction is met. In another implementation, a multi-part policy is defined as a policy that applies to a single transaction but at least one policy condition of the multi-part policy requires evaluation of data or metadata not available in the single transaction. In yet another implementation, a multi-part policy is defined as a policy that applies to a single transaction but at least one policy condition of the multi-part policy requires evaluation of data or metadata available in an external data or metadata store. In a further another implementation, a multi-part policy is defined as a policy that applies to a single transaction but at least one policy condition of the multi-part policy requires evaluation of data or metadata generated by an external engine. In another implementation, a multi-part policy is defined as a policy that applies in real-time during active analysis but at least one policy condition of the multi-part policy requires evaluation of data or metadata collected in deferred time or non-real-time inspection. Examples of multi-part policies includes "prevent user form uploading/downloading, if user is at risk as indicated by anomaly detection", "prevent sharing of a file, if file is sensitive", "prevent download of a file to a device, if the device is at risk as indicated by a malware detection engine", "prevent deletion of a virtual machine, if the virtual machine is a critical server", and others. These are also stored as policies 175.

Figure 7:
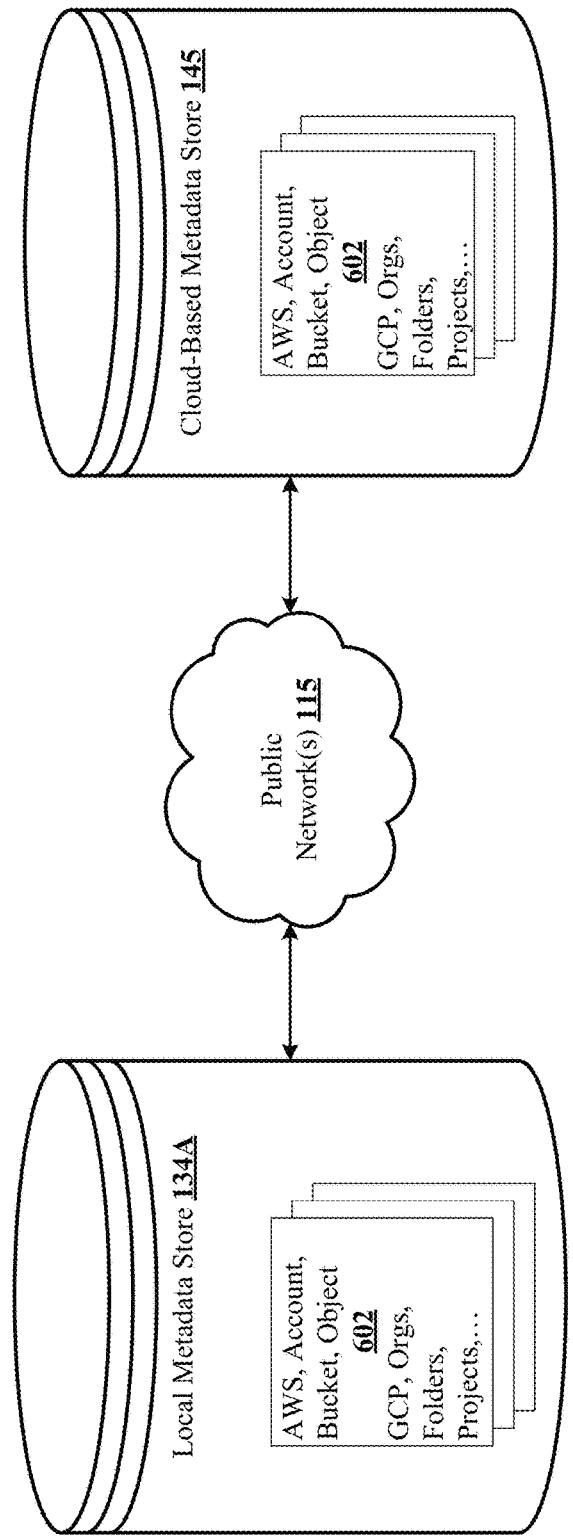
FIG. 7 shows resource list synchronization between a local metadata store and a cloud-based metadata store.

FIG. 7 shows resource list synchronization between the local metadata store 134A and the cloud-based metadata store 145 via the public network(s) 115.

DLP Policy Enforcement

Figure 8:
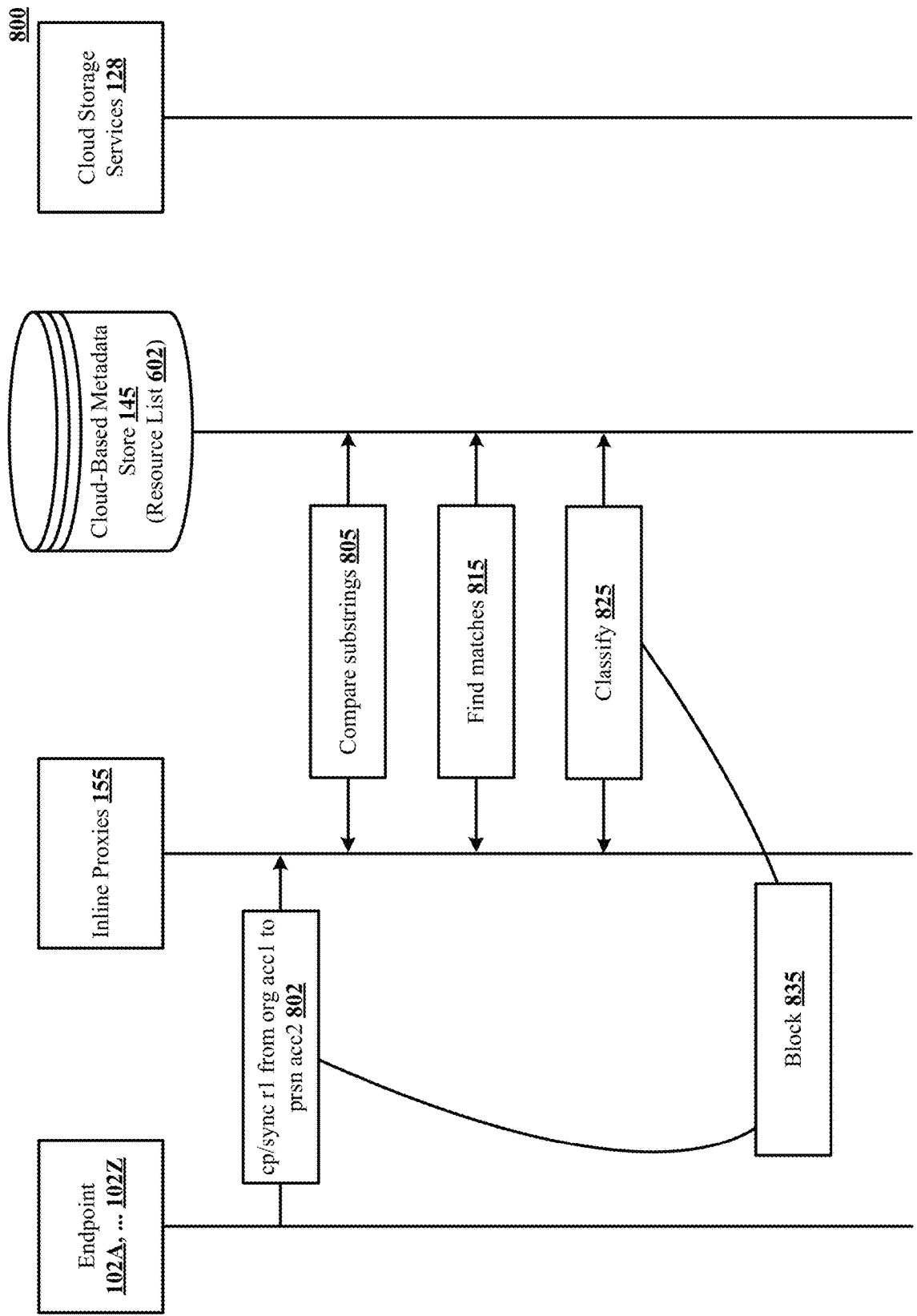
FIG. 8 is a message exchange chart of implementation of using cloud-based inline proxies to enforce data loss prevention policies on resource-level transactions that do not identify resource data.

FIG. 8 is a message exchange chart 800 of implementation of using cloud-based inline proxies to enforce data loss prevention policies on resource-level transactions that do not identify resource data.

Endpoints 102A-Z issue resource-level transactions 802 that are intercepted by the inline proxies 155. The resource-level transactions 802 request copying of an organization's resources on the cloud storage services 128 from controlled locations to uncontrolled locations and do not identify data stored in the resources. In one implementation, the controlled locations are subject to inspection for data loss prevention by a network security system 135. For example, the controlled locations are the organization's accounts on the cloud storage services 128. In one implementation, the uncontrolled locations are not subject to inspection for data loss prevention by the network security system 135. For example, the uncontrolled locations are user accounts on the cloud storage services 128. In another example, the uncontrolled locations are accounts of other organizations on the cloud storage services 128. In yet another example, the uncontrolled locations are other accounts of the same organization on the cloud storage services 128. The resources can be Amazon Web Services (AWS) buckets, Microsoft Azure blobs, Google Cloud Platform (GCP) buckets, and Alibaba Cloud buckets.

The inline proxies 155 then compare 805 substrings in the resource-level transactions 802 to entries in the resource list 602 (stored in the cloud-based metadata store 145) that identifies the organization's resources on the cloud storage services 128. The inline proxies 155 then find matches 815 based on the comparison 805 and classify 825 the resource-level transactions 802 as malicious data egress attempts.

The inline proxies 155 then block 835 the malicious data egress attempts by preventing the copying, and thereby enforcing the data loss prevention policies.

The inline proxies 155 can use a parser 185 and a classifier 195 to perform the above steps. Parser 185 applies feature extraction on the resource-level transactions 802 and determines the resource names. One example of feature extraction includes identifying lexical characteristics of strings and substrings of a resource URL by traversing the address structure and data elements contained in the URL. Another example of feature extraction includes using domain name system (DNS) resolution to identify IP addresses, host names, and other destination identifiers associated with a resource URL. Examples of resource identifiers outputted or extracted by the parser 185 include domain names, subdomain names, URLs, server names (e.g. server name indications (SNIs), HOST headers), source countries, source IP address, and destination IP address.

Classifier 195 compares the strings and substrings associated with the extracted resource identifiers to entries in the resource list 602. Classifier 195 can use different similarity measures to determine whether an extracted resource identifier is present in the resource list 602. Some examples of similarity measures used by the classifiers include Jaccard similarity, Euclidean distance, Cosine similarity, Levenshtein distance, Tanimoto coefficient, Dice coefficient, Hamming distance, Needleman-Wunch distance or Sellers Algorithm, Smith-Waterman distance, Gotoh Distance or Smith-Waterman-Gotoh distance, Block distance or L1 distance or City block distance, Monge Elkan distance, Jaro distance metric Jaro Winkler, SoundEx distance metric, Matching Coefficient, Dice Coefficient, Overlap Coefficient, Variational distance, Hellinger distance or Bhattacharyya distance, Information Radius (Jensen-Shannon divergence) Harmonic Mean, Skew divergence, Confusion Probability, Tau, Fellegi and Sunters (SFS) metric, FastA, BlastP, Maximal matches, q-gram, Ukkonen Algorithms, edit distance technique, and Soergel distance.

Figure 9:
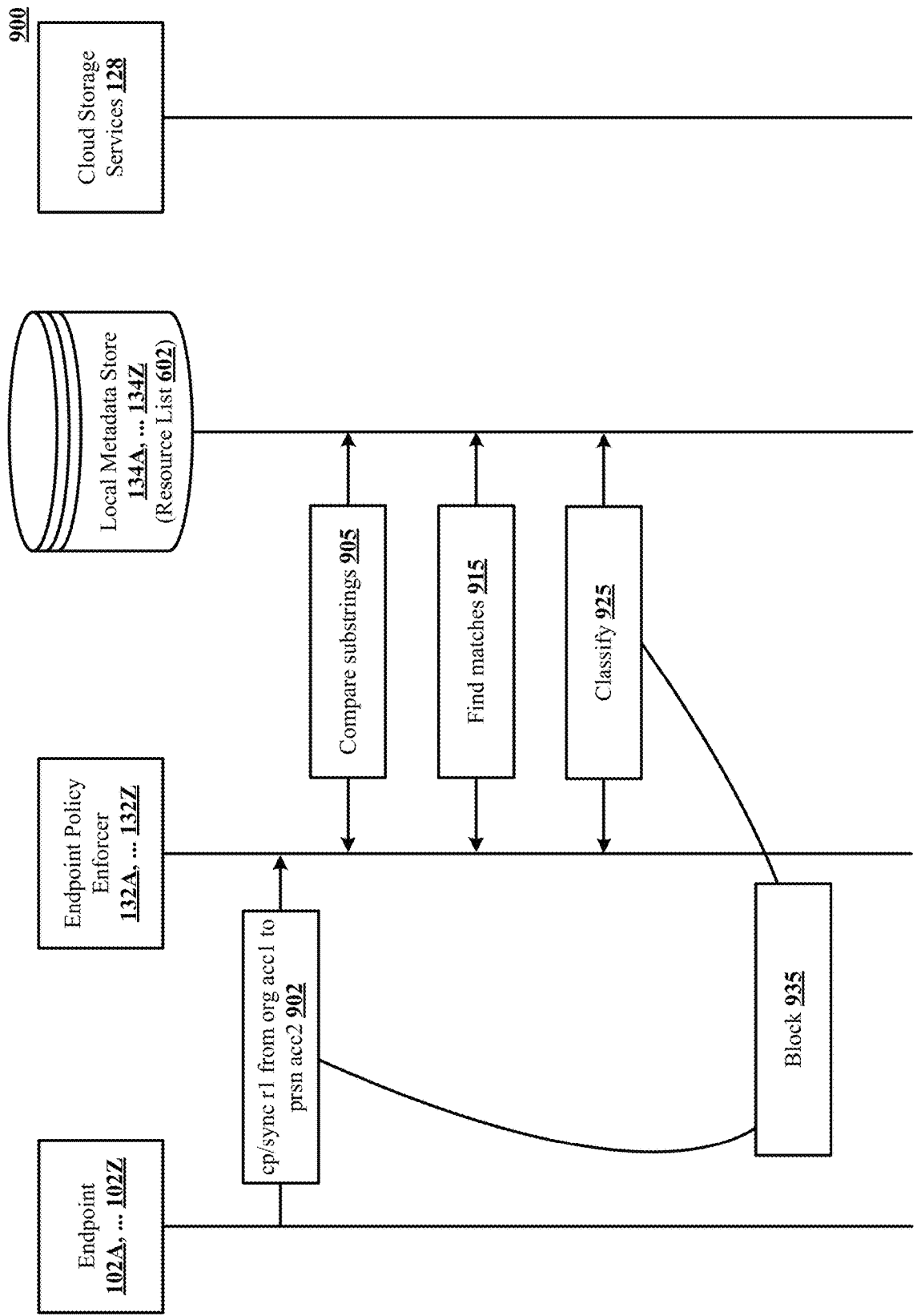
FIG. 9 is a message exchange chart of implementation of using an endpoint policy enforcer to enforce data loss prevention policies on resource-level transactions that do not identify resource data.

FIG. 9 is a message exchange chart 900 of implementation of using an endpoint policy enforcer to enforce data loss prevention policies on resource-level transactions that do not identify resource data.

Endpoints 102A-N issue resource-level transactions 902 that are intercepted by the endpoint policy enforcers 132A-N. The resource-level transactions 902 request copying of an organization's resources on the cloud storage services 128 from controlled locations to uncontrolled locations and do not identify data stored in the resources. In one implementation, the controlled locations are subject to inspection for data loss prevention by a network security system 135. For example, the controlled locations are the organization's accounts on the cloud storage services 128. In one implementation, the uncontrolled locations are not subject to inspection for data loss prevention by the network security system 135. For example, the uncontrolled locations are user accounts on the cloud storage services 128. In another example, the uncontrolled locations are other accounts of the organization on the cloud storage services 128. The resources can be Amazon Web Services (AWS) buckets, Microsoft Azure blobs, Google Cloud Platform (GCP) buckets, and Alibaba Cloud buckets.

The endpoint policy enforcers 132A-N then compare 905 substrings in the resource-level transactions 902 to entries in the resource list 602 (stored in the local metadata store 134A-Z) that identifies the organization's resources on the cloud storage services 128. The endpoint policy enforcers 132A-N then find matches 915 based on the comparison 905 and classify 925 the resource-level transactions 902 as malicious data egress attempts.

The endpoint policy enforcers 132A-N then block 935 the malicious data egress attempts by preventing the copying, and thereby enforcing the data loss prevention policies.

The endpoint policy enforcers 132A-N can use the parser 195 and the classifier 195 to perform the above steps.

Computer System

Figure 10:
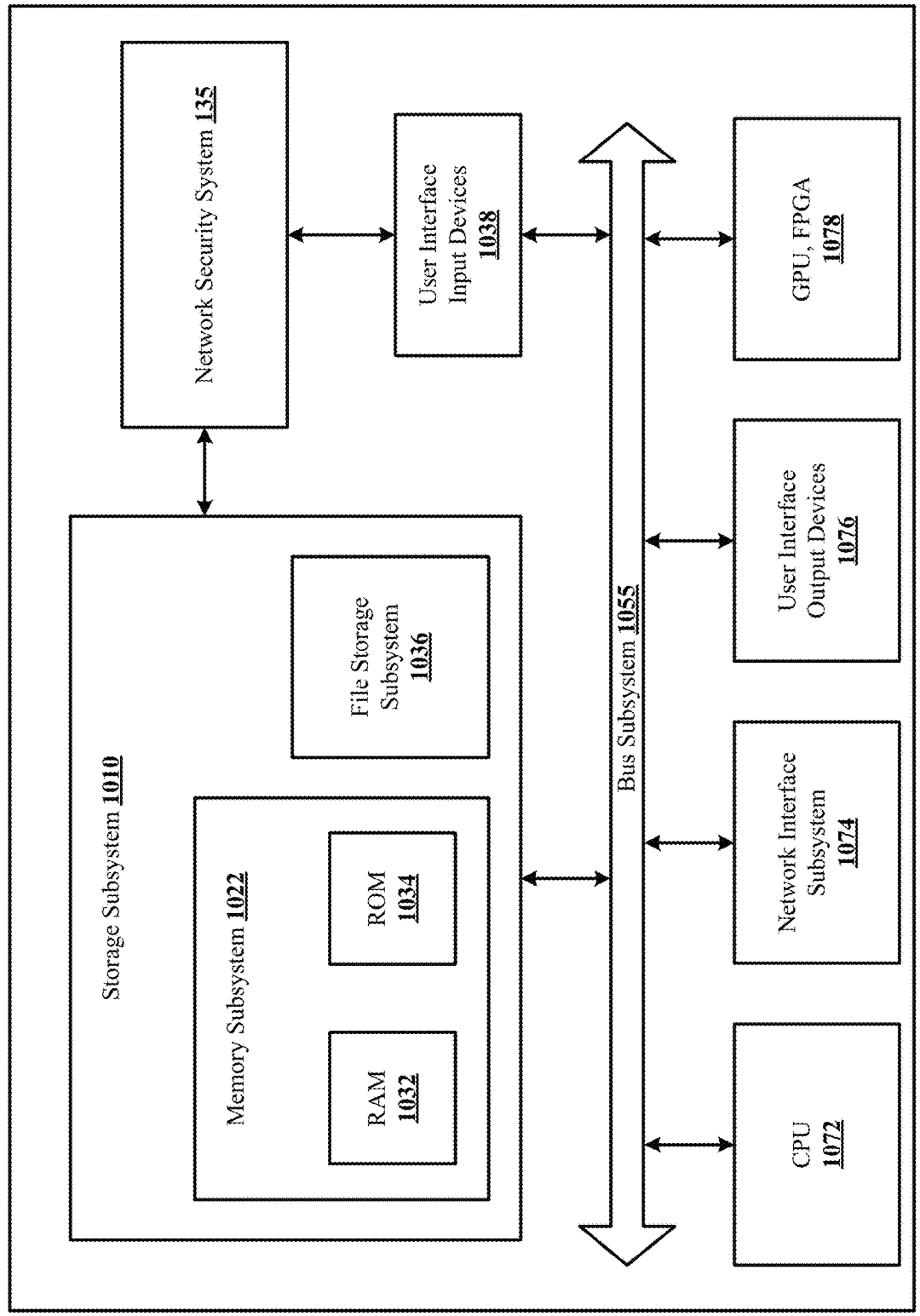
FIG. 10 is a simplified block diagram of a computer system that can be used to implement the technology disclosed.

FIG. 10 is a simplified block diagram of a computer system 1000 that can be used to implement the technology disclosed. Computer system 1000 includes at least one central processing unit (CPU) 1072 that communicates with a number of peripheral devices via bus subsystem 1055. These peripheral devices can include a storage subsystem 1010 including, for example, memory devices and a file storage subsystem 1036, user interface input devices 1038, user interface output devices 1076, and a network interface subsystem 1074. The input and output devices allow user interaction with computer system 1000. Network interface subsystem 1074 provides an interface to outside networks, including an interface to corresponding interface devices in other computer systems.

In one implementation, the cloud-based network security system (NSS) 135 are communicably linked to the storage subsystem 1010 and the user interface input devices 1038.

User interface input devices 1038 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1000.

User interface output devices 1076 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1000 to the user or to another machine or computer system.

Storage subsystem 1010 stores programming and data constructs that provide the functionality of some or all of the modules and methods described herein. Subsystem 1078 can be graphics processing units (GPUs) or field-programmable gate arrays (FPGAs).

Memory subsystem 1022 used in the storage subsystem 1010 can include a number of memories including a main random access memory (RAM) 1032 for storage of instructions and data during program execution and a read only memory (ROM) 1034 in which fixed instructions are stored. A file storage subsystem 1036 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1036 in the storage subsystem 1010, or in other machines accessible by the processor.

Bus subsystem 1055 provides a mechanism for letting the various components and subsystems of computer system 1000 communicate with each other as intended. Although bus subsystem 1055 is shown schematically as a single bus, alternative implementations of the bus subsystem can use multiple busses.

Computer system 1000 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1000 depicted in FIG. 10 is intended only as a specific example for purposes of illustrating the preferred embodiments of the present invention. Many other configurations of computer system 1000 are possible having more or less components than the computer system depicted in FIG. 10.

Particular Implementations

We disclose a computer-implemented method of enforcing data loss prevention policies on resource-level transactions that do not identify resource data. The method includes intercepting resource-level transactions that request copying of an organization's resources on cloud storage services from controlled locations to uncontrolled locations and do not identify data stored in the resources.

The method includes comparing substrings in the resource-level transactions to entries in a resource list that identifies the organization's resources on the cloud storage services.

The method includes finding matches based on the comparison and classifying the resource-level transactions as malicious data egress attempts.

The method includes blocking the malicious data egress attempts by preventing the copying, and thereby enforcing the data loss prevention policies.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in these implementations can readily be combined with sets of base features identified in other implementations.

In one implementation, the resources can be Amazon Web Services (AWS) buckets, Microsoft Azure blobs, Google Cloud Platform (GCP) buckets, and Alibaba Cloud buckets.

In one implementation, the controlled locations are subject to inspection for data loss prevention by a network security system. In one implementation, the uncontrolled locations are not subject to inspection for data loss prevention by the network security system.

In some implementations, the method includes using cloud-based inline proxies interposed between endpoints from which the resource-level transactions originate and the cloud storage services to perform the intercepting, the comparing, the finding and classifying, and the blocking.

In one implementation, the resource list is maintained in cloud-based metadata stores.

In some implementations, the method includes using endpoint policy enforcers running on the endpoints to perform the intercepting, the comparing, the finding and classifying, and the blocking.

In one implementation, the resource list is maintained in local metadata stores at the endpoints.

In some implementations, the method includes not finding matches based on the comparison and classifying the resource-level transactions as benign data egress attempts and fulfilling the benign data egress attempts by allowing the copying.

In one implementation, the resource list is generated by an introspector that scans the organization's accounts on the cloud storage services and detects that the resources are configured to store the organization's data.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

In another implementation, an introspector scans an organization's accounts on cloud storage services and detects resources on the cloud storage services configured to store the organization's data. The detected resources are identified in a resource list.

An inline proxy controls manipulation of the detected resources based on the resource list.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in these implementations can readily be combined with sets of base features identified in other implementations.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the implementations.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A computer-implemented method of enforcing data loss prevention policies on resource-level transactions that do not identify resource data, the method including:
   intercepting resource-level transactions from client endpoints, wherein:
      the resource-level transactions request copying of an organization's resources on cloud storage services from controlled locations to uncontrolled locations,
      the resource-level transactions do not identify data stored in the resources, and the controlled locations are subject to inspection for data loss prevention by a network security system while the uncontrolled locations are not subject to inspection for data loss prevention by the network security system;
   extracting identifiers that identify the resources in the resource-level transaction;
   generating substrings of the resource-level transactions by preprocessing the identifiers that identify the resources, wherein the preprocessing comprises lexically tokenizing the identifiers by demarcating the identifier using character-based delimiters;
   comparing the substrings to entries in a resource list that identifies the organization's resources on the cloud storage services;
   finding matches in a subset of the resource-level transactions based on the comparison and classifying the subset of the resource-level transactions as malicious data egress attempts; and
   blocking the malicious data egress attempts by preventing the copying, thereby enforcing the data loss prevention policies.

2. The computer-implemented method of claim 1, wherein the resources comprise Amazon Web Services (AWS) buckets, Microsoft Azure blobs, Google Cloud Platform (GCP) buckets, or Alibaba Cloud buckets.

3. The computer-implemented method of claim 1, wherein the resources comprise Kubernetes or Docker pods.

4. The computer-implemented method of claim 1, wherein the resources comprise projects.

5. The computer-implemented method of claim 1, wherein the resources comprise blobs.

6. The computer-implemented method of claim 1, wherein the resource list is maintained in cloud-based metadata stores.

7. The computer-implemented method of claim 1, further including using endpoint policy enforcers running on the endpoints to perform the intercepting, the extracting, the generating, the comparing, the finding and classifying, and the blocking.

8. The computer-implemented method of claim 7, wherein the resource list is maintained in local metadata stores at the endpoints.

9. The computer-implemented method of claim 1, further including:
   not finding matches in a second subset of the resource-level transactions based on the comparison and classifying the second subset of the resource-level transactions as benign data egress attempts; and
   fulfilling the benign data egress attempts by allowing the copying.

10. The computer-implemented method of claim 1, wherein the resource list is generated by an introspector that scans the organization's accounts on the cloud storage services and detects that the resources are configured to store the organization's data.

11. A computer-implemented method, including:
scanning, by an introspector, an organization's accounts on cloud storage services and detecting resources on the cloud storage services configured to store the organization's data;
storing, by the introspector, the detected resources in a resource list; and
controlling, by an inline proxy, manipulation of the detected resources based on the resource list, wherein the controlling comprises:
intercepting resource-level transactions from client endpoints, wherein:
the resource-level transactions request copying resources on cloud storage services from controlled locations to uncontrolled locations, and
the resource-level transactions do not identify data stored in the resources;
extracting identifiers that identify the resources in the resource-level transaction;
generating substrings of the resource-level transactions by preprocessing the identifiers that identify the resources, wherein the preprocessing comprises lexically tokenizing the identifiers by demarcating the identifier using character-based delimiters;
comparing the substrings to entries in the resource list;
finding matches in a subset of the resource-level transactions based on the comparison and classifying the subset of the resource-level transactions as malicious data egress attempts; and
blocking the malicious data egress attempts by preventing the copying, thereby enforcing data loss prevention policies.

12. The computer-implemented method of claim 11, further comprising:
extracting, by the introspector, second identifiers that identify the resources on the cloud storage services;
preprocessing, by the introspector, the second identifiers that identify the resources, wherein the preprocessing comprises lexically tokenizing the second identifiers by demarcating the second identifier using character-based delimiters,
wherein the tokens may be classified into resource name, endpoint, and key; and
storing, by the introspector, at least one of the tokens in the resource list.

13. The computer-implemented method of claim 12, wherein the stored tokens comprise a resource name.

14. A non-transitory computer readable storage medium impressed with computer program instructions to enforce data loss prevention policies on resource-level transactions that do not identify resource data, the instructions, when executed on a processor, implement a method comprising:
intercepting resource-level transactions from client endpoints, wherein:
the resource-level transactions request copying of an organization's resources on cloud storage services from controlled locations to uncontrolled locations,
the resource-level transactions do not identify data stored in the resources, and
the controlled locations are subject to inspection for data loss prevention by a network security system while the uncontrolled locations are not subject to inspection for data loss prevention by the network security system;
extracting identifiers that identify the resources in the resource-level transaction;
generating substrings of the resource-level transactions by preprocessing the identifiers that identify the resources, wherein the preprocessing comprises lexically tokenizing the identifiers by demarcating the identifier using character-based delimiters;
comparing the substrings to entries in a resource list that identifies the organization's resources on the cloud storage services;
finding matches in a subset of the resource-level transactions based on the comparison and classifying the subset of the resource-level transactions as malicious data egress attempts; and
blocking the malicious data egress attempts by preventing the copying, thereby enforcing the data loss prevention policies.

15. The non-transitory computer readable storage medium of claim 14, wherein the resources are Amazon Web Services (AWS) buckets, Microsoft Azure blobs, Google Cloud Platform (GCP) buckets, and Alibaba Cloud buckets.

16. The non-transitory computer readable storage medium of claim 14, wherein the resources comprise projects.

17. The non-transitory computer readable storage medium of claim 14, wherein the resources comprise Kubernetes or Docker pods.

18. The non-transitory computer readable storage medium of claim 14, wherein the resources comprise blobs.

19. A system, comprising:
one or more processors; and
one or more memories having stored thereon instructions that, upon execution by the one or more processors, cause the one or more processors to:
intercept resource-level transactions from client endpoints, wherein:
the resource-level transactions request copying of an organization's resources on cloud storage services from controlled locations to uncontrolled locations, and
the resource-level transactions do not identify data stored in the resources;
extract identifiers that identify the resources in the resource-level transaction;
generate substrings of the resource-level transactions by preprocessing the identifiers that identify the resources, wherein the preprocessing comprises lexically tokenizing the identifiers by demarcating the identifier using character-based delimiters;
compare the substrings to entries in a resource list that identifies the organization's resources on the cloud storage services;
finding matches in a subset of the resource-level transactions based on the comparison and classifying the subset of the resource-level transactions as malicious data egress attempts; and
blocking the malicious data egress attempts by preventing the copying, thereby enforcing data loss prevention policies.

20. The system of claim 19, wherein the resources are Amazon Web Services (AWS) buckets, Microsoft Azure blobs, Google Cloud Platform (GCP) buckets, and Alibaba Cloud buckets.

* * * * *